United States Patent
Ahmed et al.

(10) Patent No.: US 12,393,545 B2
(45) Date of Patent: Aug. 19, 2025

(54) AUTOMATIC HIGH-SPEED SHUTDOWN FOR C-PHY RECEIVER

(71) Applicant: QUALCOMM Incorporated, San Diego, CA (US)

(72) Inventors: Yasser Ahmed, San Diego, CA (US); Sachin Ajit Devamare, San Diego, CA (US); Vinaya Ajjampura Rajappa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 18/460,905

(22) Filed: Sep. 5, 2023

(65) Prior Publication Data

US 2025/0077461 A1    Mar. 6, 2025

(51) Int. Cl.
*G06F 13/42*    (2006.01)
*G06F 13/40*    (2006.01)

(52) U.S. Cl.
CPC .. *G06F 13/4282* (2013.01); *G06F 2213/0016* (2013.01)

(58) Field of Classification Search
CPC ............. G06F 13/4282; G06F 2213/0016
USPC ............. 710/15, 19, 29, 30, 32, 65, 68, 105
See application file for complete search history.

(56) References Cited

U.S. PATENT DOCUMENTS

| | | | |
|---|---|---|---|
| 6,345,073 B1* | 2/2002 | Curry | H03M 13/2732 375/147 |
| 7,571,267 B1* | 8/2009 | Luis | G06F 13/4291 713/400 |
| 10,469,214 B1* | 11/2019 | Dudulwar | H03L 7/07 |
| 2003/0202622 A1* | 10/2003 | Hajimiri | H04L 7/02 375/354 |
| 2017/0117979 A1 | 4/2017 | Sengoku et al. | |
| 2017/0118039 A1* | 4/2017 | Wiley | H04L 12/40136 |
| 2018/0131503 A1 | 5/2018 | Duan et al. | |
| 2019/0188159 A1* | 6/2019 | Song | G06F 13/20 |

OTHER PUBLICATIONS

International Search Report and Written Opinion—PCT/US2024/036031—ISA/EPO—Oct. 1, 2024.

* cited by examiner

*Primary Examiner* — Farley Abad
*Assistant Examiner* — Henry W Yu
(74) *Attorney, Agent, or Firm* — Loza & Loza, LLP

(57) ABSTRACT

An interface circuit has a data recovery circuit, a protocol interface circuit and a controller or processor that can be implemented using a finite state machine. The data recovery circuit may be configured to receive a stream of symbols over three wires of a serial bus according to a high-speed mode defined by a Mobile Industry Processor Interface Alliance C-PHY protocol. The protocol interface circuit may be coupled to an output of the data recovery circuit and configured to receive data from the data recovery circuit. The finite state machine may be configured to cause the data recovery circuit to be disabled when an end of transmission is indicated in a first end-of-transmission signal received from the protocol interface circuit.

30 Claims, 12 Drawing Sheets

800

| MegaSymbols per second (Msps) | High-Speed Shut Down Timer Value |
|---|---|
| 100 | 0x6B |
| 200 | 0x33 |
| 300 | 0x20 |
| 400 | 0x17 |
| 600 | 0x0D |
| 700 | 0x0B |
| 800 | 0x09 |
| 900 | 0x07 |
| 1000 | 0x06 |
| 1100 | 0x05 |
| 1200 | 0x04 |
| 1300 | 0x03 |
| 1400 | 0x03 |
| 1500 | 0x02 |
| 1600 | 0x02 |
| 1700 | 0x01 |
| 1800 | 0x01 |
| 2000 | 0x00 |
| 2500 | 0x00 |
| 3000 | 0x00 |
| 3500 | 0x00 |

802 — Low resolution
804 — No resolution

Link Parameters
- LP-000           70ns
- Preamble         315 UI
- Postamble        182 UI
- Timer Clock      400 MHz

FIG. 8

AUTOMATIC HIGH-SPEED SHUTDOWN FOR C-PHY RECEIVER

TECHNICAL FIELD

The present disclosure relates generally to serial communication over a serial bus in a wireless communication device and, more particularly, to timely termination of high-speed C-PHY interface circuits.

BACKGROUND

Mobile communication devices typically include a variety of components such as circuit boards, integrated circuit (IC) devices, application-specific integrated circuit (ASIC) devices and/or System-on-Chip (SoC) devices. The types of components may include processing circuits, user interface components, storage and other peripheral components that communicate over a serial bus. The serial bus may be operated in accordance with a standardized or proprietary protocol. In one example, the serial bus can be operated in accordance with an Inter-Integrated Circuit (I2C or I$^2$C) communication protocol. The I2C bus is configured as a multi-drop bus and was developed to connect low-speed peripherals to a processor. The two wires of an I2C bus include a Serial Data Line (SDA) that carries a data signal, and a Serial Clock Line (SCL) that carries a clock signal.

Multiple standards are defined for interconnecting certain types of components in mobile communication devices. For example, different types of interfaces may be used for communication between an application processor and display or camera components in a mobile communication device. Some display or camera components employ an interface that conforms to standards or protocols specified by the Mobile Industry Processor Interface (MIPI) Alliance for a camera serial interface (CSI) and a display serial interface (DSI).

The MIPI Alliance DSI, DSI-2 (referred to individually or collectively herein as DSI) and CSI and CSI-2 (referred to individually or collectively herein as CSI) standards define wired interfaces that can be deployed within an IC or between some combination of IC devices and SoC devices. CSI protocols may be used to couple a camera and application processor. DSI protocols may be used to couple an application processor and display subsystem. The low-level physical-layer (PHY) interface in each of these applications can be implemented in accordance with MIPI Alliance C-PHY standards and protocols. High-speed modes and low-power modes of communication are defined for C-PHY interfaces. The C-PHY high-speed mode uses a low-voltage multiphase signal transmitted in different phases on a 3-wire link. The low-power modes of C-PHY interfaces provide lower rates than the high-speed modes and transmit signals at higher voltages.

As device technology improves, a combination of demand for higher data rates over serial buses have been met in some instances by increasing the clock rates used to control signaling over serial interfaces. For example, the version 2.0 specification for MIPI C-PHY interfaces provides for transmission clock rates of between 4.5 GHZ and 6.0 GHz. Increasing transmission clock frequencies can decrease the tolerances and margins defined for data signals. Certain control sequences are transmitted during C-PHY transactions to before a change in mode of operation of C-PHY interfaces. Receiving devices may use timers to control shut down or disabling of high-speed physical layer circuits. The timers may be configured to expire after a duration that is longer than necessary to to enable buffered symbols and data to be processed before the high-speed physical layer circuits are disabled or reconfigured for a different mode of operation. The additional time allowed by the timers results in unnecessary consumption of power by the high-speed physical layer circuits. There is an ongoing need to unnecessary reduce power consumption in C-PHY interfaces in order to preserve battery power and limit heat generation and dissipation in portable devices.

SUMMARY

Certain aspects of the disclosure relate to systems, apparatus, methods and techniques that enable mobile communication devices and other portable devices to detect and respond to end of transmission conditions in a C-PHY interface. A receiving device may be configured to automatically shut down or disable high-speed physical layer circuits in its C-PHY interface as soon as the last encoded symbol has been decoded, and/or after data buffers controlled by the high-speed physical layer circuits have been flushed.

In various aspects of the disclosure, an interface circuit has a data recovery circuit, a protocol interface circuit and a controller or processor that can be implemented using a finite state machine. The data recovery circuit may be configured to receive a stream of symbols over three wires of a serial bus according to a high-speed mode defined by a Mobile Industry Processor Interface (MIPI) Alliance C-PHY protocol. The protocol interface circuit may be coupled to an output of the data recovery circuit and configured to receive data from the data recovery circuit. The finite state machine may be configured to cause the data recovery circuit to be disabled when an end of transmission is indicated in a first end-of-transmission (EOT) signal received from the protocol interface circuit.

In various aspects of the disclosure, a method for operating a communication interface circuit includes converting a stream of symbols at a data recovery circuit to a plurality of data words, the stream of symbols being received over three wires of a serial bus according to a high-speed mode defined by a MIPI Alliance C-PHY protocol, providing the plurality of data words to a protocol interface circuit, and disabling the data recovery circuit when an end of transmission is indicated in a first EOT signal received from the protocol interface circuit.

In various aspects of the disclosure, an apparatus includes means for converting a stream of symbols at a data recovery circuit to a plurality of data words, means for processing the plurality of data words including a protocol interface circuit, and means for disabling the data recovery circuit when an end of transmission is indicated in a first EOT signal received from the protocol interface circuit. The stream of symbols may be received over three wires of a serial bus according to a high-speed mode defined by a MIPI Alliance C-PHY protocol.

In various aspects of the disclosure, a processor-readable storage medium includes code configured to cause a processing circuit to convert a stream of symbols at a data recovery circuit to provide a plurality of data words, the stream of symbols being received over three wires of a serial bus according to a high-speed mode defined by a MIPI Alliance C-PHY protocol, provide the plurality of data words to a protocol interface circuit, and disable the data recovery circuit when an end of transmission is indicated in a first EOT signal received from the protocol interface circuit.

In certain aspects, signaling defined for transitioning the serial bus to a low-speed mode defined by the MIPI Alliance C-PHY protocol is received at the interface circuit after the end of transmission is indicated. A continued pattern of symbols corresponding to a POST pattern defined by the MIPI Alliance C-PHY protocol may be received when the end of transmission is indicated.

In certain aspects, the end of transmission is indicated when the protocol interface circuit has completed processing of the data received from the data recovery circuit. A first-in-first-out (FIFO) buffer circuit may be used to couple the protocol interface circuit to the output of the data recovery circuit. The FIFO buffer circuit may be configured to store a plurality of data words received from the data recovery circuit. The end of transmission is indicated when the FIFO buffer has been emptied of the plurality of data words.

In one aspect, a clock generation circuit configured to provide a protocol interface clock signal that controls operation of the protocol interface circuit. The protocol interface clock signal may be suppressed when the data recovery circuit is disabled.

In some implementations, a synchronization circuit is configured to propagate the first EOT signal as a second EOT signal in accordance with timing provided by an internally generated clock signal used by the finite state machine.

BRIEF DESCRIPTION OF THE DRAWINGS

FIG. 8 illustrates an example of a lookup table that can be used to control shutdown of the high-speed physical layer circuits in a C-PHY interface.

DETAILED DESCRIPTION

Figure 1:
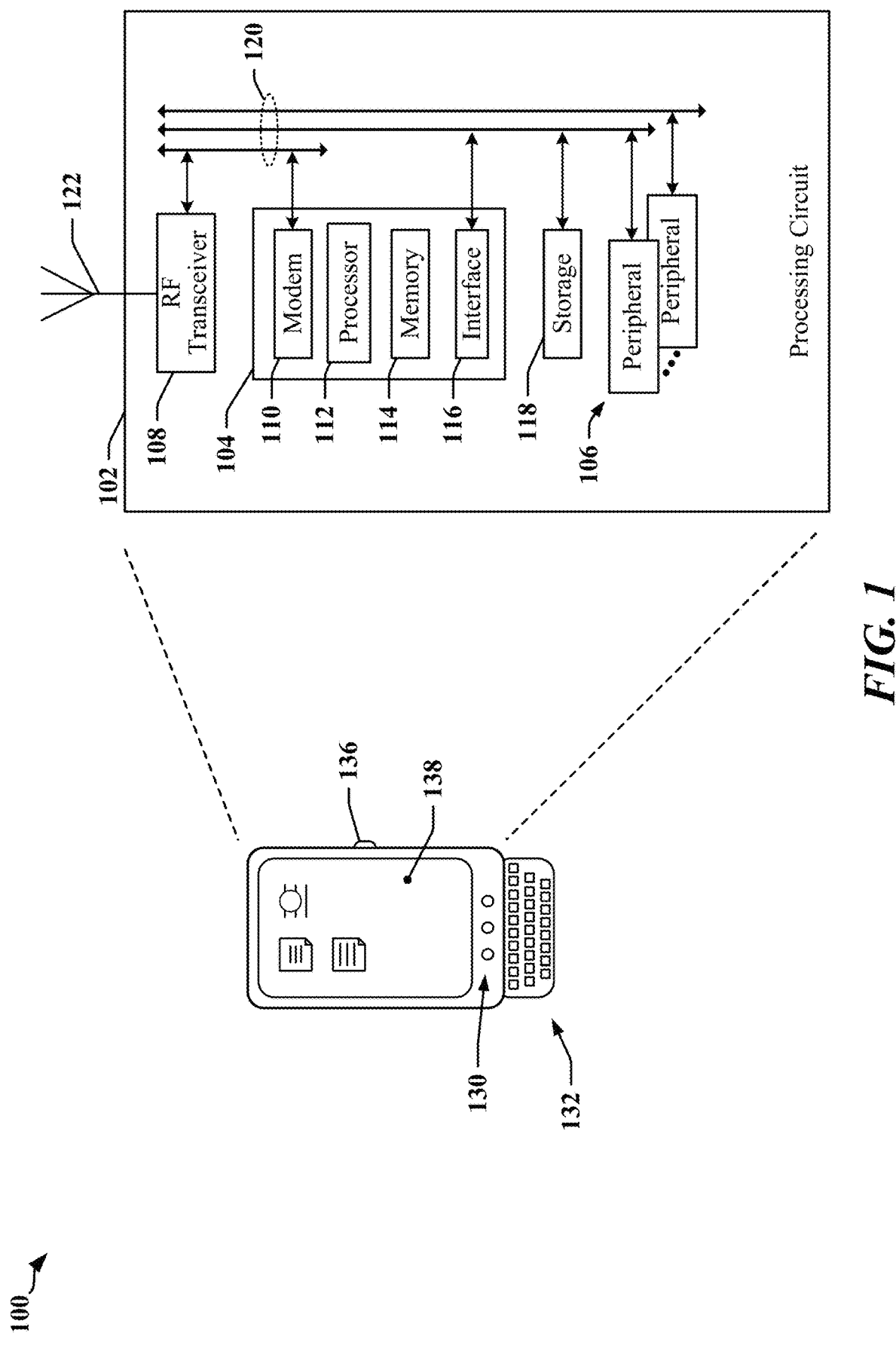
FIG. 1 illustrates an apparatus employing a data link between IC devices and that is selectively operated according to a standard or proprietary protocol.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Data communication links employed by SoCs and other IC devices to connect processors with modems and other peripherals may be operated in accordance with industry or proprietary standards or protocols associated with certain functions or types of devices. In the example of display panels, display subsystems, and display drivers, communication standards and protocols defined by the MIPI Alliance are frequently used. The Display Serial Interface (DSI®), for example, provides C-PHY standards and protocols used to define, configure and control a high-speed serial interface between a host processor and a display module.

Certain aspects of the disclosure relate to serial bus configurations in which two or more devices can communicate at different times. The described serial buses are typically operated in a hierarchical manner, in that one device controls communication during a transaction. The controlling device may be referred to as a host device, a bus master device, a managing device or another term favored by standards defining the protocols implemented by the controlling device. In some serial bus configurations, a single controlling device manages or controls communication during all transactions conducted over the serial bus. In other serial bus configurations, more than one device can operate as the controlling device while another device serves as the controlling device for a transaction conducted over the serial bus. The controlling device may provide control signaling that facilitates clock synchronization and that identifies a type of transaction to be conducted over a conventional two-wire serial bus. The receiving devices may be referred to as a client device, a slave device, a subordinate device, a peripheral device or another term favored by standards defining the protocols implemented by the controlling device. For the purposes of this disclosure, a controlling device may be referred to as a host device and associated receiving devices may be referred to as subordinate devices.

According to certain aspects of the disclosure, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that includes multiple devices or circuits coupled through one or more data communication buses. A processing circuit 102 of the apparatus 100 includes multiple circuits or devices 104, 106 and/or 108. In some examples, the processing circuit 102 is implemented using one or more ASICs. In other examples, the processing circuit 102 is implemented in an SoC. In one example, the apparatus 100 may be configured to operate as a communication device and the processing circuit 102 includes an ASIC 104, one or more peripheral devices 106, and a transceiver 108 that cooperate to enable the apparatus to communicate through an antenna 122 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that provides an application programming interface (API) layer that enables the one or more processors 112 to execute software modules residing in the on-board memory 114 or other processor-readable storage 118 provided on the processing circuit 102. The software modules may include instructions and data stored in the on-board memory 114 or processor-readable storage 118. The ASIC 104 may access its on-board memory 114, the processor-readable storage 118, and/or storage external to the processing circuit 102. The on-board memory 114, the processor-readable storage 118 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 122, a display 138, operator controls, such as switches or buttons 136, 130 and/or an integrated or external keypad 132, among other components. A user interface module may be configured to operate with the display 138, external keypad 132, etc. through a dedicated communication link or through one or more serial data interconnects.

The processing circuit 102 may provide multiple buses 120 that enable communication between two or more devices 104, 106, and/or 108. In one example, the ASIC 104 may include bus interface circuits 116 coupled to one or more of the buses 120. Each of the bus interface circuits 116 may include a combination of circuits, counters, timers, control logic and other configurable circuits or modules. In one example, certain bus interface circuits 116 may be configured to operate in accordance with standards-defined communication specifications or protocols. The processing circuit 102 may include or control a power management function that configures and manages the operation of the apparatus 100.

Figure 2:
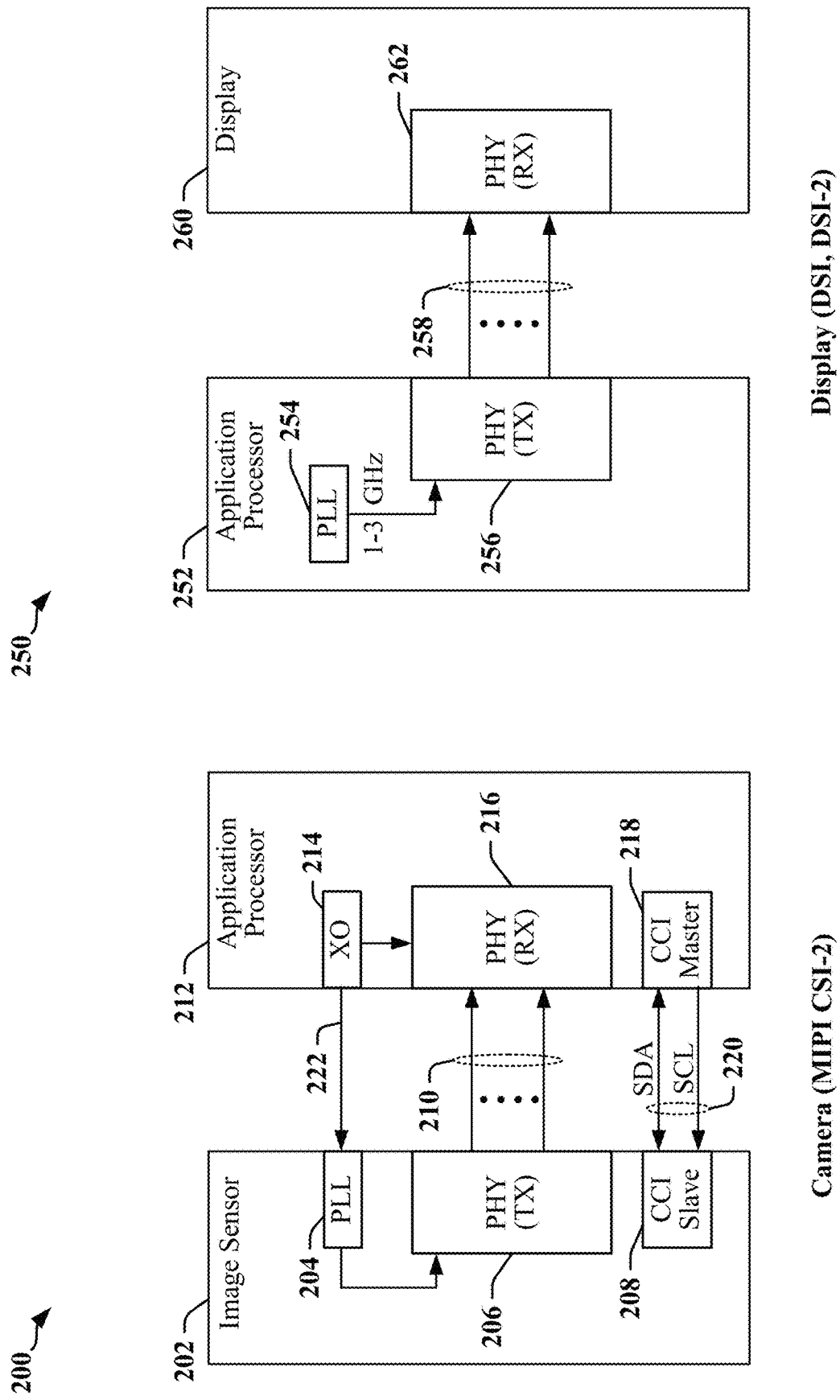
FIG. 2 illustrates examples of interface circuits that may be adapted in accordance with certain aspects of this disclosure.

FIG. 2 illustrates examples of interface circuits that may be employed or adapted in accordance with certain aspects of this disclosure. A first interface circuit is configured as a camera subsystem 200 and a second interface circuit is configured as a display subsystem 250. The interface circuits may be deployed in a mobile communication device, for example. The camera subsystem 200 may include a CSI-2 defined communication link between an image sensor 202 and an application processor 212. The communication link may include a high-data rate data transfer link 210 used by the image sensor 202 to transmit image data to the application processor 212 using a transmitter 206. The high-data rate data transfer link 210 may be configured and operated according to C-PHY protocols. In one example, a physical layer interface implemented using MIPI Alliance-defined C-PHY technology and protocols may be referred to as a C-PHY interface, and may be used to connect camera or display to an application processor. The application processor 212 may include a crystal oscillator (XO 214) or other clock source to generate a clock signal 222 that controls the operation of the transmitter 206. The clock signal 222 may be processed by a phase-locked loop (PLL) 204 in the image sensor 202. In some instances, the clock signal 222 may also be used by the C-PHY receiver 216 in the application processor 212. The communication link may include a Camera Control Interface (CCI), which is similar in nature to the Inter-Integrated Circuit (I2C) interface. The CCI bus may include a Serial Clock (SCL) line that carries a clock signal and a Serial Data (SDA) line that carries data. The CCI link 220 may be bidirectional and may operate at a lower data rate than the high-data rate data transfer link 210. The CCI link 220 may be used by the application processor 212 to exchange control and configuration information with the image sensor 202. The application processor 212 may include a CCI bus master 218 and the image sensor 202 may include a CCI subordinate 208.

The display subsystem 250 may include a unidirectional data link 258 that can be configured and operated according to C-PHY protocols. In the application processor 252, a clock source such as the PLL 254 may be used to generate a bit clock signal used by a C-PHY receiver 256 to control transmissions on the data link 258. At the display device 260, a C-PHY receiver 262 may extract embedded clock information from sequences of symbols transmitted on the data link, or from a clock lane provided in the data link 258.

Certain aspects disclosed herein relate to systems, apparatus and methods that support a broad range of interface protocols, and that can operate using different physical media. As shown in FIG. 2, for example, the camera subsystem 200 and/or display subsystem 250 may communicate high data rate information using C-PHY protocols. In some configurations, the camera subsystem 200 and/or display subsystem 250 may communicate using a reverse channel (e.g., the CCI link 220) for configuration of an image sensor 202 or other device. In some instances, a low-power mode of operation may be defined for links that use either C-PHY protocols.

Figure 3:
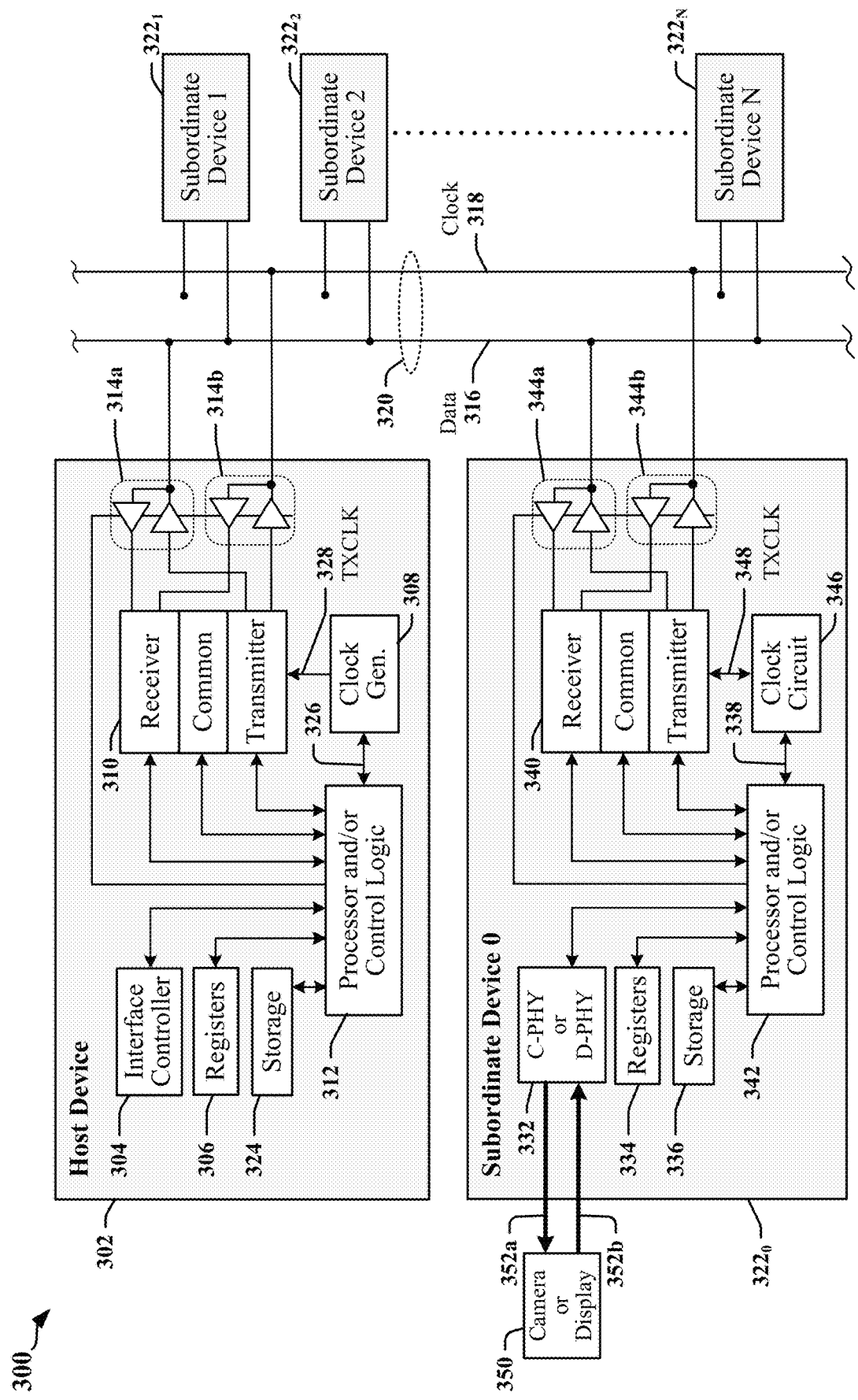
FIG. 3 illustrates a system architecture for an apparatus employing a C-PHY data link between IC devices.

FIG. 3 illustrates an example of an apparatus 300 employing a data link that may be used to communicatively couple two or more devices, subcomponents or circuits. Here, the apparatus 300 includes multiple devices 302, and $322_0$-$322_N$ coupled to a two-wire serial bus 320. The devices 302 and $322_0$-$322_N$ may be implemented in one or more semiconductor IC devices, such as an application processor, SoC or ASIC. In various implementations certain of the devices 302 and $322_0$-$322_N$ may include, support or operate as a modem, a signal processing device, a display driver, a camera, a user interface, a sensor, a sensor controller, a media player, a transceiver, and/or other such components or devices. In some examples, one or more devices $322_0$-$322_N$ may be used to control, manage or monitor a sensor device. Communication between devices 302 and $322_0$-$322_N$ over the serial bus 320 is controlled by a bus master device 302. Certain types of bus can support multiple bus masters 302.

In one example, a bus master device 302 includes an interface controller 304 that may be configured to manage access to the serial bus, configure dynamic addresses for subordinate devices and/or generate a clock signal 328 to be transmitted on a clock line 318 of the serial bus 320. The bus master device 302 may include configuration registers 306 or other storage 324, and other control logic 312 configured to handle protocols and/or higher-level functions. The control logic 312 may include a processing circuit such as a state machine, sequencer, signal processor or general-purpose processor. The bus master device 302 includes a transceiver 310 and line drivers/receivers 314a and 314b. The transceiver 310 may include receiver, transmitter and common circuits, where the common circuits may include timing, logic and storage circuits and/or devices. In one example, the transmitter encodes and transmits data based on timing in the clock signal 328 provided by a clock generation circuit 308. Other timing clocks 326 may be used by the control logic 312 and other functions, circuits or modules.

At least one device $322_0$-$322_N$ may be configured to operate as a subordinate device on the serial bus 320 and may include circuits and modules that support a display, an image sensor, and/or circuits and modules that control and communicate with one or more sensors that measure environmental conditions. In one example, a device $322_0$ configured to operate as a subordinate device may provide a control function, physical layer circuit 332 that includes circuits and modules to support a display, an image sensor, and/or circuits and modules that control and communicate with one or more sensors that measure environmental conditions. In this example, the device $322_0$ can include configuration registers 334 or other storage 336, control logic 342, a transceiver 340 and line drivers/receivers 344a and 344b. The control logic 342 may include a processing circuit such as a state machine, sequencer, signal processor or general-purpose processor. The transceiver 340 may include receiver, transmitter and common circuits, where the common circuits may include timing, logic and storage circuits and/or devices. In one example, the transmitter encodes and transmits data based on timing in a clock signal 348 provided by clock generation and/or recovery circuits 346. In some instances, the clock signal 348 may be derived from a signal received from the clock line 318. Other timing clocks 338 may be used by the control logic 342 and other functions, circuits or modules.

The serial bus 320 may be operated in accordance with standards defined protocol or proprietary protocol. In some instances, two or more devices 302, $322_0$-$322_N$ may be configured to operate as a bus master device on the serial bus 320. In some instances, the apparatus 300 includes multiple serial buses 320, 352a and/or 352b that couple two or more of the devices 302, $322_0$-$322_N$ or one of the devices 302, $322_0$-$322_N$ and a peripheral device such as a display or camera 350 or a Radio-Frequency IC (RFIC). In some examples, one subordinate device $322_0$ is configured to operate as a display or camera coupled to a display or camera 350. The latter subordinate device $322_0$ may include a physical layer circuit 332 that is configured to operate as a C-PHY interface controller that communicates with the display or camera 350 over a serial bus 352a or 352b operated in accordance with a C-PHY protocol.

In certain aspects of this disclosure, systems and apparatus may employ multi-phase data encoding and decoding interface methods for communicating between IC devices. A multi-phase encoder may drive a plurality of conductors (i.e., 3 conductors). Each conductor may be referred to as a wire, although the conductors may include conductive traces on a circuit board or traces or interconnects within a conductive layer of a semiconductor IC device. In one example, a physical layer interface implemented using MIPI Alliance-defined C-PHY technology and protocols may be referred to as a C-PHY interface, and may be used to connect camera or display to an application processor. The C-PHY interface employs three-phase symbol encoding to transmit data symbols on 3-wire lanes, or "trios" where each trio includes an embedded clock. A trio may be referred to as a lane herein. A multi-lane C-PHY communication channel may be established using multiple trios to carry data exchanged between a pair of devices, where each channel includes one trio that carries a portion of the data, which may be independently encoded in accordance with C-PHY protocols.

The C-PHY interface provides a three-phase encoding scheme for a three-wire system. The three-phase encoding scheme defines three phase states and two polarities, providing 6 states and 5 possible transitions from each state. Deterministic voltage and/or current changes may be detected and decoded to extract data from the three wires.

Figure 4:
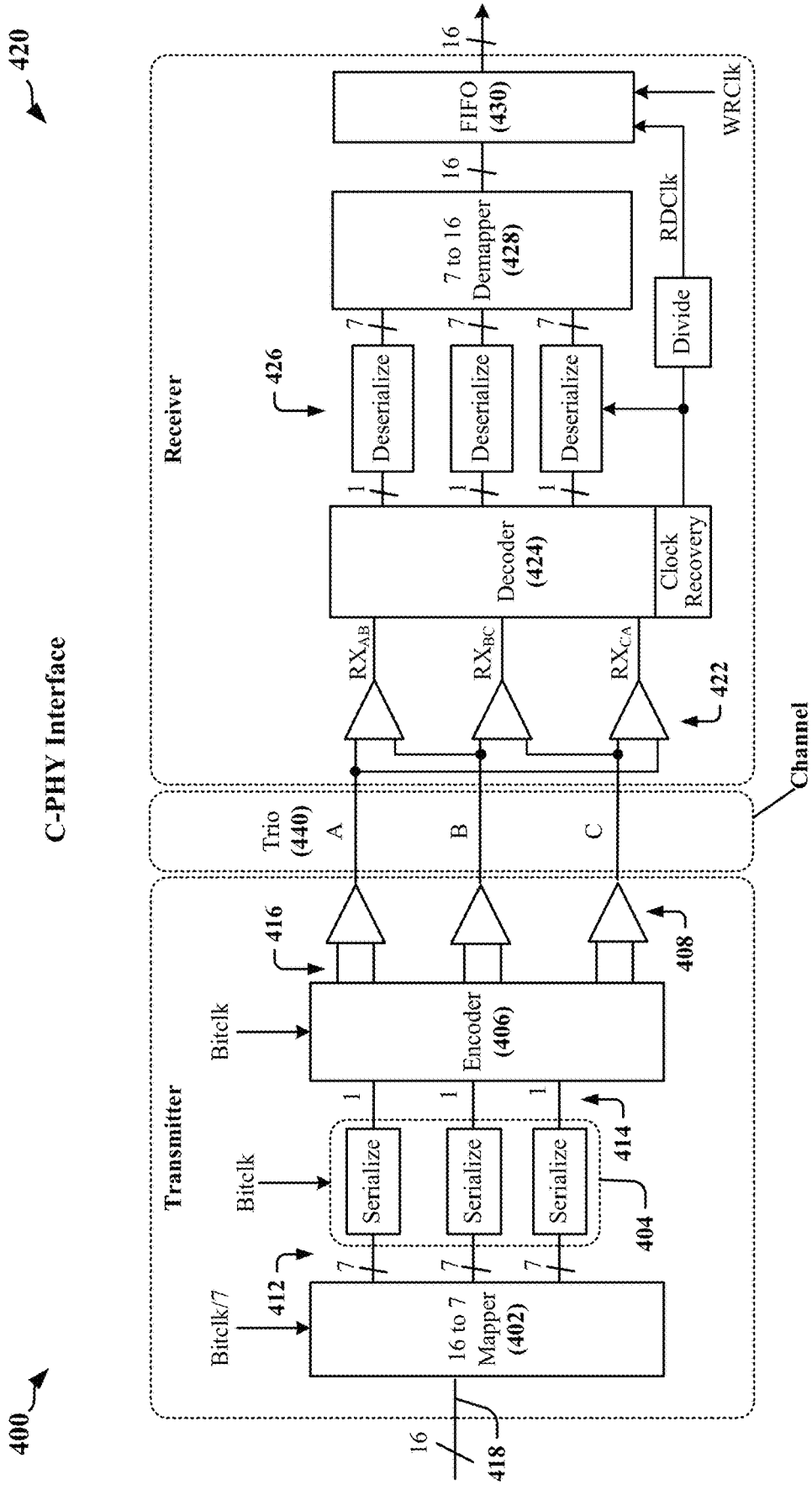
FIG. 4 illustrates an example of a C-PHY interface that may be adapted according to certain aspects disclosed herein.

FIG. 4 illustrates a C-PHY interface that may be used to implement certain aspects of the serial bus 352a or 352b depicted in FIG. 3. The illustrated example may relate to a three-wire link configured to carry three-phase polarity encoded data in accordance with DSI protocols. The use of 3-phase polarity encoding provides for high-speed data transfer and may consume half or less of the power of other interfaces at the desired operating frequency because fewer than 3 drivers are active at any time in a C-PHY link. The C-PHY interface uses 3-phase polarity encoding to encode multiple bits per symbol transition on the three-wire link. In one example, a combination of three-phase encoding and polarity encoding may be used to support a wide video graphics array (WVGA), 80 frames per second liquid crystal display driver IC without a frame buffer, delivering pixel data for display refresh at 810 Mbps over three or more wires.

In the depicted C-PHY interface, three-phase polarity encoding is used to control signaling state of connectors, wires, traces and other interconnects that provide a channel for communication. In the illustrated example, a single unidirectional channel, or lane, is provided using a combination of three wires (the trio 440). Each wire in the trio 440 may be undriven, driven positive, or driven negative in any symbol transmission interval. In some instances, an undriven signal wire of the trio 440 may be in a high-impedance state. In some instances, an undriven signal wire of the trio 440 may be driven or pulled to a voltage level that lies substantially halfway between the positive and negative voltage levels provided on driven signal wires. In some instances, an undriven signal wire of the trio 440 may have no current flowing through it. Drivers 408 in a transmitter 400 coupled to the signal wires of the trio 440 are controlled such that only one wire of the trio 440 is in each of three states (denoted as +1, −1, or 0) in each symbol interval.

In one example, the drivers 408 include unit-level current-mode drivers. In another example, the drivers 408 drive opposite polarity voltages on two signals transmitted on two signal wires of the trio 440 while the third signal wire is at high impedance and/or pulled to ground. For each transmitted symbol interval, at least one signal is in the undriven (0) state, while one signal is driven to the positive (+1 state) and one signal is driven to the negative (−1 state), such that the sum of current flowing to a receiver 420 is zero amperes. For each symbol, the state of at least one signal wire of the trio 440 is changed from the symbol transmitted in the preceding transmission interval.

In the transmitter 400, a mapper 402 may receive a 16-bit input data word 418, and the mapper 402 may map the input data word 418 to 7 symbols 412 for transmitting sequentially over the signal wires of the trio 440. An M-wire, N-phase encoder 406 configured for three-wire, three-phase encoding receives the 7 symbols 412 produced by the mapper one input symbol 414 at a time and computes the state of each signal wire of the trio 440 for each symbol interval, based on the immediately preceding state of the signal wires of the trio 440. The 7 symbols 412 may be serialized using parallel-to-serial converters 404, for example. The encoder 406 provides control signals 416 to define the outputs of the drivers 408. The encoder 406 selects the states of the signal wires of the trio 440 based on the input symbol 414 and the previous states of signal wires of the trio 440 and may provide control signals 416 to cause the drivers 408 to produce the desired signaling state on the trio 440.

The use of three-wire, three-phase encoding permits several bits to be encoded in a plurality of symbols where the bits per symbol is not an integer. In the example of a three-wire, three-phase system, there are 3 available combinations of 2 wires, which may be driven simultaneously, and 2 possible combinations of polarity on the simultaneously driven pair of wires, yielding 6 possible states. Since each transition occurs from a current state, 5 of the 6 states are available at every transition. With 5 states, $\log_2(5) \approx 2.32$ bits may be encoded per symbol transition. Accordingly, a mapper may accept a 16-bit word and convert it to a 7-symbol sequence because 7 symbols carrying 2.32 bits per symbol can encode 16.24 bits. In other words, a combination of seven symbols that encodes five states has $5^7$ (78,125) permutations. Accordingly, the 7 symbols may be used to encode the $2^{16}$ (65,536) permutations of 16 bits.

In the illustrated example, the receiver 420 includes comparators 422 and a decoder 424 that are configured to provide a digital representation of the state of each of three signal wires of the trio 440, as well as the change in the state of the three signal wires compared to the state transmitted in the previous symbol period. In the illustrated example, seven consecutive states are assembled by serial-to-parallel convertors 426 and used to produce a set of 7 symbols to be processed by a demapper 428 to obtain 16 bits of data that may be buffered in a first-in-first-out (FIFO) storage device 430, which may be implemented using registers, for example. In another example, fourteen consecutive states are assembled by suitably configured serial-to-parallel convertors and used to produce a set of 14 symbols to be processed by a demapper to obtain 32 bits of data that may be buffered in a 32-bit wide FIFO storage device.

Figure 5:
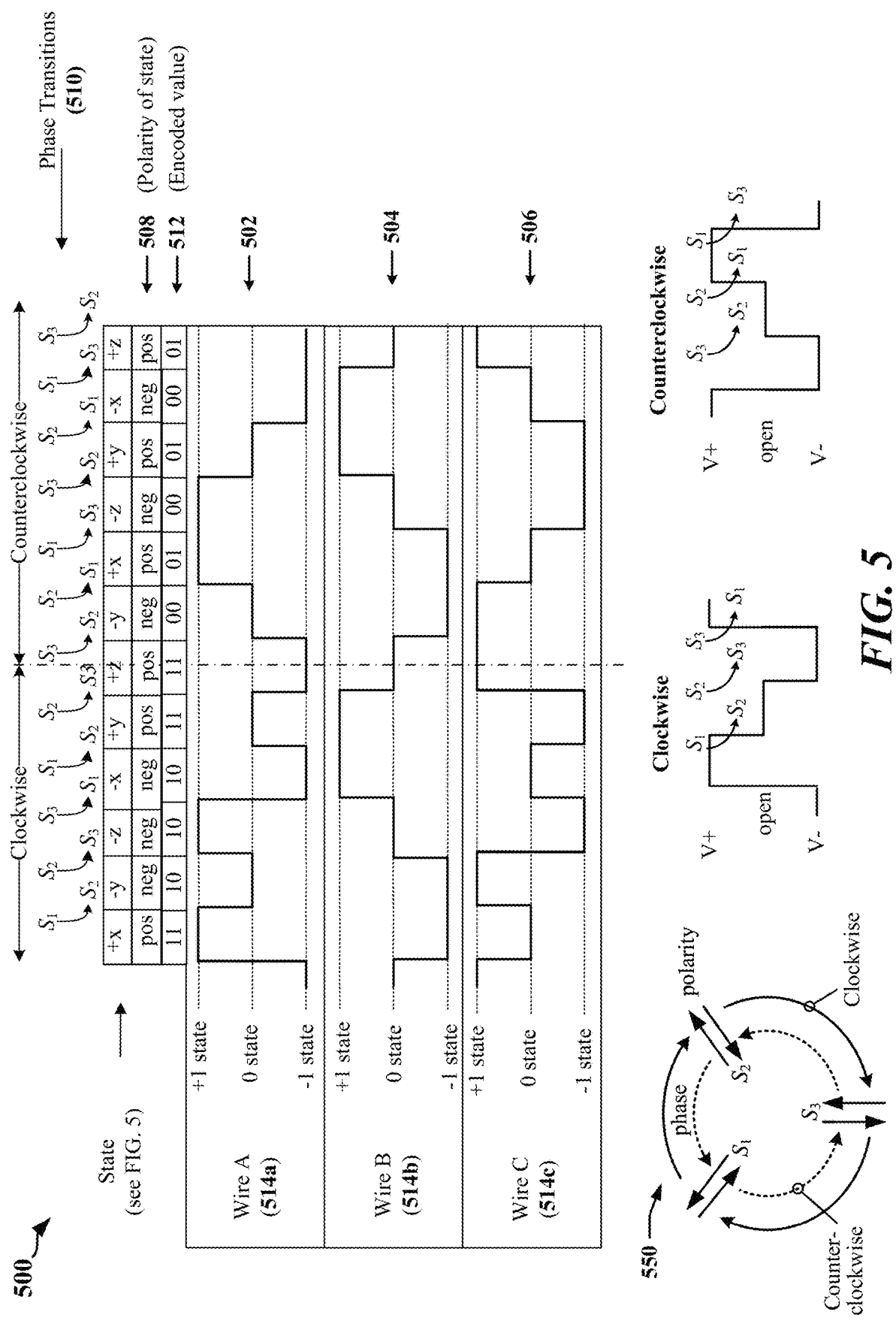
FIG. 5 illustrates signaling in an example of an N-phase polarity encoded interface.

FIG. 5 illustrates an example of signaling 500 employing a 3-phase modulation data-encoding scheme based on the circular state transition diagram 550. According to the data-encoding scheme, the phase of a 3-phase signal may rotate in two directions and may be transmitted on three wires 514a, 514b and 514c, identified as connectors A, B, and C. Each of the three signals is independently driven on the wires 514a, 514b, 514c. Each of the three signals includes the 3-phase signal, with each signal being 120 degrees out of phase relative to the other two signals. At any point in time, each of the three wires 514a, 514b, 514c is in a different one of the states {+1, 0, −1}. At any point in time, each of the three wires 514a, 514b, 514c in a 3-wire system is in a different state than the other two wires. When more than three conductors or wires are used, two or more pairs of wires may be in the same state. The illustrated encoding scheme may also encode information in the polarity of the two wires 514a, 514b and/or 514c that are actively driven to the +1 and −1 states. Polarity is indicated at 508 for the sequence of states depicted.

At any phase state in the illustrated 3-wire example, exactly two of the wires 514a, 514b, 514c carry a signal which is effectively a differential signal for that phase state, while the third wire 514a, 514b or 514c is undriven. The phase state for each wire 514a, 514b, 514c may be determined by voltage difference between the wire 514a, 514b or 514c and at least one other wire 514a, 514b and/or 514c, or by the direction of current flow, or lack of current flow, in the wire 514a, 514b or 514c. As shown in the state transition diagram 550, three phase states ($S_1$, $S_2$ and $S_3$) are defined. A signal may flow clockwise from phase state $S_1$ to phase state $S_2$, phase state $S_2$ to phase state $S_3$, and/or phase state $S_3$ to phase state $S_1$ and the signal may flow counterclockwise from phase state $S_1$ to phase state $S_3$, phase state $S_3$ to phase state $S_2$, and/or phase state $S_2$ to phase state $S_1$. For other values of N, transitions between the N states may optionally be defined according to a corresponding state diagram to obtain circular phase rotation between state transitions.

In the example of a 3-wire, 3-phase communication link, clockwise phase rotations ($S_1$ to $S_2$), ($S_2$ to $S_3$), and/or ($S_3$ to $S_1$) at a phase transition 510 (between states) may be used to encode a logic 1, while counterclockwise phase rotations ($S_1$ to $S_3$), ($S_3$ to $S_2$), and/or ($S_2$ to $S_1$) at the phase transition 510 may be used to encode a logic 0. Accordingly, a bit may be encoded at each transition by controlling whether the phase of the signal is "rotating" clockwise or counterclockwise. For example, a logic 1 may be encoded when the three wires 514a, 514b, 514c transition from phase state $S_1$ to phase state $S_2$ and a logic 0 may be encoded when the three wires 514a, 514b, 514c transition from phase state $S_1$ to phase state $S_3$. In the 3-wire example depicted, direction of phase rotation may be easily determined based on which of the three wires 514a, 514b, 514c is undriven before and after the transition.

Information may also be encoded in the polarity and/or changes of polarity of state 508 of the driven wires 514a, 514b, 514c, or in the direction of current flow or changes in the direction of current flow between two wires 514a, 514b, 514c. Signals 502, 504, and 506 illustrate voltage levels applied to wires 514a, 514b, 514c, respectively at each phase state in a 3-wire, 3-phase link. At any time, a first wire 514a, 514b, 514c is coupled to a more positive voltage (+V, for example), a second wire 514a, 514b, 514c is coupled to a more negative voltage (−V, for example), while the third wire 514a, 514b, 514c may be open-circuited. As such, one polarity encoding state may be determined by the current flow between the first and second wires 514a, 514b, 514c or the voltage polarities of the first and second wires 514a, 514b, 514c. In some embodiments, two bits of data 512 may be encoded in each phase transition 510. A decoder may determine the direction of signal phase rotation to obtain the first bit. The second bit may be determined based on the polarity difference between two of the signals 502, 504 and 506. In some instances, the second bit may be determined based on a change or lack of change in polarity of the differential signal transmitted on a pair of the wires 514a, 514b, 514c. The decoder having determined direction of phase rotation can determine the phase state and the polarity of the voltage applied between the two active wires 514a, 514b and/or 514c, or the direction of current flow through the two active wires 514a, 514b and/or 514c.

In the example of the 3-wire, 3-phase link described herein, one bit of data may be encoded in the phase rotation, or phase change in the 3-wire, 3-phase link, and an additional bit may be encoded in the polarity or changes in polarity of two driven wires. In certain embodiments, more than two bits can be encoded in each transition of a 3-wire, 3-phase encoding system by allowing transition to any of the possible states from a current state. Given three rotational phases and two polarities for each phase, 6 states are defined, such that 5 states are available from any current state. Accordingly, there may be $\log_2(5) \cong 2.32$ bits per symbol (transition) and the mapper may accept a 16-bit word and convert it to 7 symbols.

Figure 6:
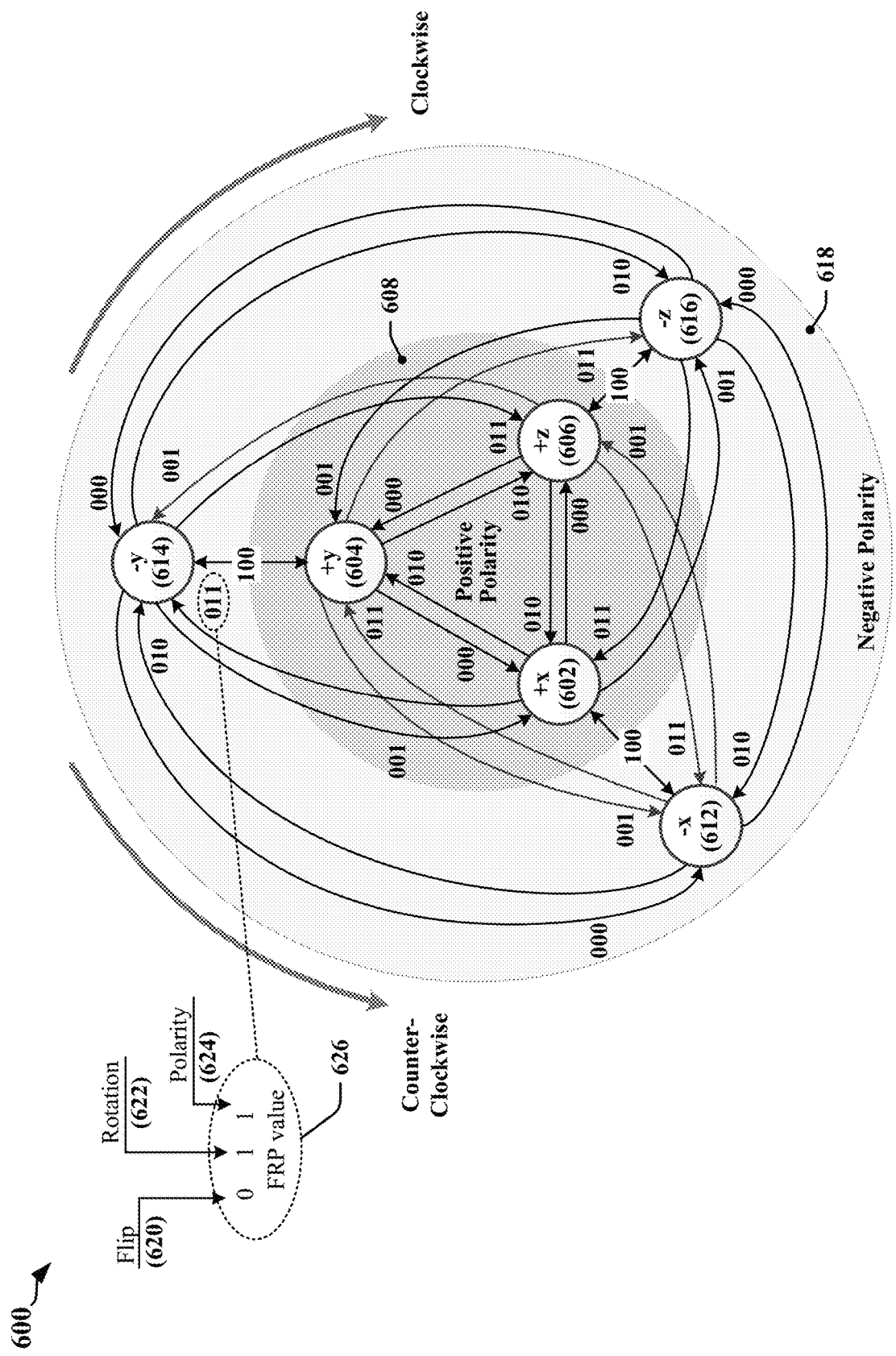
FIG. 6 is state diagram illustrating signaling states and transitions between signaling states in a C-PHY interface implemented in accordance with certain aspects disclosed herein.

FIG. 6 is a state transition diagram 600 illustrating the possible signaling states 602, 604, 606, 612, 614, 616 of the three wires in a 3-wire, 3-phase interface, including in a MIPI Alliance C-PHY high-speed mode interface for example. All possible transitions from each signaling state 602, 604, 606, 612, 614, 616 are illustrated. The transitions in the state transition diagram 600 can be represented by a Flip, Rotate, Polarity (FRP) symbol 626 that has one of the three-bit binary values in the set: {000, 001, 010, 011, 100}. The Rotate bit 622 of the FRP symbol 626 indicates the direction of phase rotation associated with a transition to a next state. The Polarity bit 624 of the FRP symbol 626 is set to binary 1 when a transition to a next state involves a change in polarity. When the Flip bit 620 of the FRP symbol 626 is set to binary 1, the Rotate and Polarity values may be ignored and/or zeroed. A flip represents a state transition that involves only a change in polarity. Accordingly, the phase of a 3-phase signal is not considered to be rotating when a flip occurs and the polarity bit is redundant when a flip occurs. The FRP symbol 626 corresponds to wire state changes for each transition. The state transition diagram 600 may be separated into an inner circle 608 that includes the positive polarity signaling states 602, 604, 606 and an outer circle 618 that encompasses the negative polarity signaling states 612, 614, 616.

Figure 7:
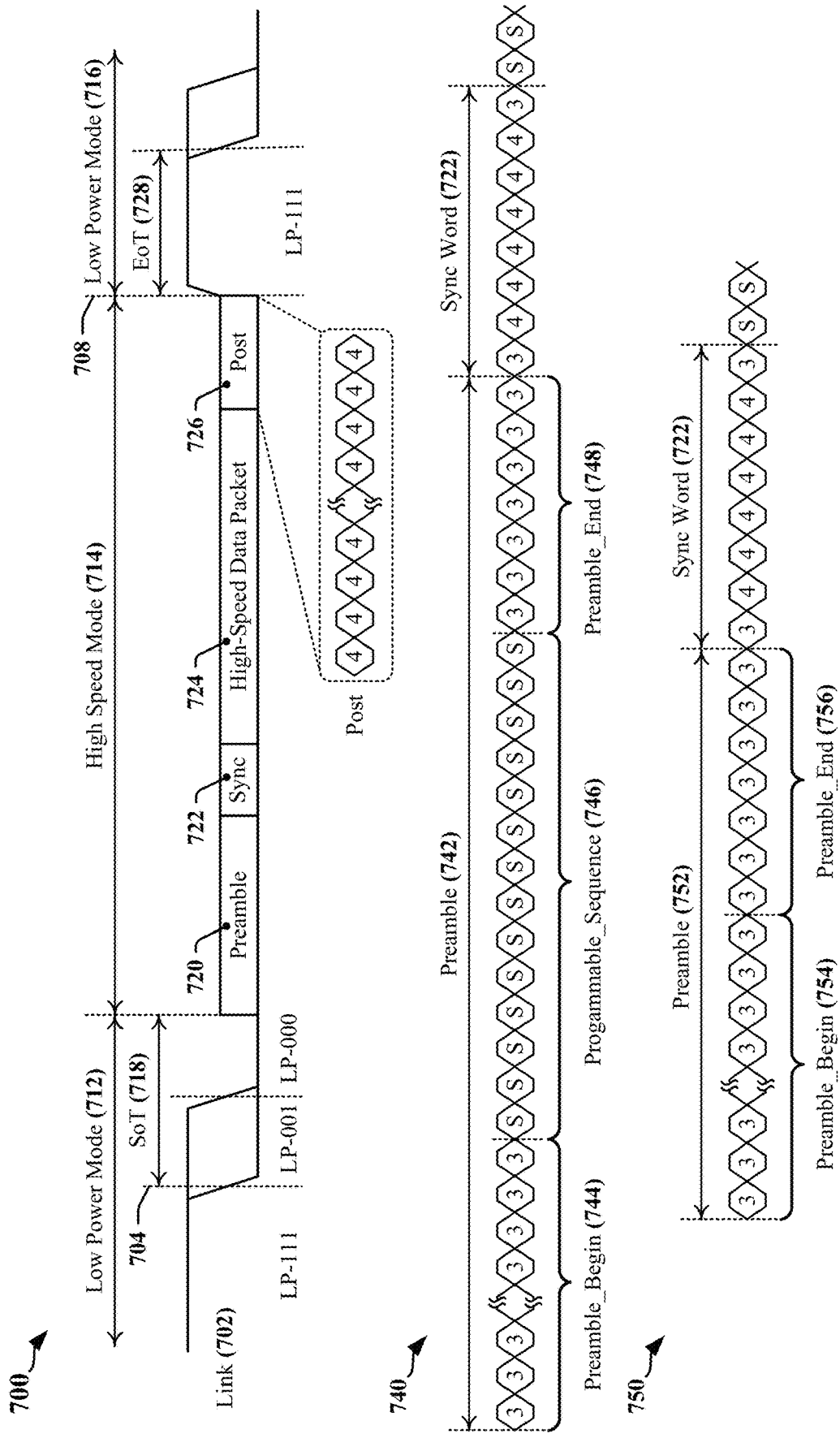
FIG. 7 illustrates certain aspects of data transmission in a C-PHY interface adapted in accordance with certain aspects disclosed herein.

FIG. 7 illustrates certain aspects of signaling on a data communication link 702 operated in accordance with C-PHY protocols. A high-speed transaction 700 is illustrated in which a C-PHY interface is initially configured for a low-power mode of operation 712. Commencing at a first time 704, the SoT sequence 718 is transmitted to switch the C-PHY interface to a low-voltage, high-speed mode of operation 714 in which data is transmitted. In the speed mode of operation 714, low-voltage differential (3-phase) signaling is used. Commencing at a second time 708, an EOT sequence 728 is transmitted to return the C-PHY interface to a low-power mode of operation 716. A "postamble" POST pattern 726) is provided at the end of a high-speed data transmission to provide a reliable notification of the end of a high-speed burst to the receiver. In some instances, a receiver may determine that the C-PHY interface is configured for the low-power mode of operation 716 based on detection of signaling at the higher voltage levels associated with the low-power mode.

A C-PHY interface adapted according to certain aspects of this disclosure transitions from high-speed to low-power modes after transmission of a POST pattern 726 defined by C-PHY protocols. According to C-PHY protocols, the POST pattern 726 is provided at the end of a high-speed data transmission to provide a reliable notification of the end of the high-speed data transmission. The POST pattern 726 includes a series of unmapped code words (e.g., a sequence in which all symbols have a value of "4"). An unmapped code word may refer to a 7-symbol sequence that is not used to encode data. The SoT sequence 718 is transmitted to initiate the high-speed mode of operation 714, and in one example, may be defined as the sequence {LP-111, LP-001, LP-000}. The SoT sequence 718 may be preceded and followed by pauses in transmission. The EOT sequence 728 may occur when the LP-111 state is transmitted for a period of time before a minimum duration in a bus idle state.

A high-speed data transmission includes a data packet 724 that includes one or more 7-symbol sequences, each 7-symbol sequence encoding a data word. Encoding and decoding can be accomplished using mapping tables that associate each permutation of 16 bits with a combination of 7 symbols. Each symbol may be an FRP symbol that determines the next signaling state of a trio based on a current signaling state of the trio. In the C-PHY encoding scheme a 7-symbol combination yields a total of 78,125 permutations ($5^7$) of which 65,536 ($2^{16}$) are uniquely associated with one of the 16-bit possible values for encoding a data word. Accordingly, 12,589 7-symbol combinations are nominally available for control use in control sequences.

C-PHY protocols define certain 7-symbol sequences that may be reserved for training, synchronization and control purposes. For example, a data packet 724 is preceded in transmission by a preamble 720 and a Sync Word 722 and the data transmission is terminated by the POST pattern 726. The preamble 720, Sync Word 722 and POST pattern 726 each include one or more reserved 7-symbol sequences. In the illustrated example, two initiation sequences 740 and 750 are shown. The initiation sequences 740 and 750 have different types of preambles.

In the first initiation sequence 740, the preamble 742 includes a programmable sequence 746 that may be used to configure, train or otherwise communicate control information to a receiver. The preamble 742 includes a Preamble_Begin sequence 744 followed by the programmable sequence 746 and completed by a Preamble_End sequence 748.

In the illustrated example, the Preamble_Begin sequence 744 includes repeated instances of a 7-symbol sequence in which every symbol has a value of '3'. The number of repetitions may be defined by protocol, by application or by configuration during calibration. The programmable sequence 746 includes some number of 7-symbol sequences that may include reserved symbols or encoded data words. The number, type and interpretation of the 7-symbol sequences in the programmable sequence 746 may be defined by protocol, by application or by configuration during calibration. In the illustrated example, the Preamble_End sequence 748 includes a single 7-symbol sequence in which every symbol has a value of '3'.

In the second initiation sequence 750, the preamble 752 includes a Preamble_Begin sequence 754 followed immediately by the Preamble_End sequence 756. In the illustrated example, the Preamble_Begin sequence 754 includes repeated instances of a 7-symbol sequence in which every symbol has a value of '3'. The number of repetitions may be defined by protocol, by application or by configuration during calibration. In the illustrated example, the Preamble_End sequence 756 includes a single 7-symbol sequence in which every symbol has a value of '3'.

Both initiation sequences 740 and 750 end with a Sync Word 722. In the illustrated example, the Preamble_End sequences 748, 756 include a single 7-symbol sequence that has a first and last transmitted symbol with a value of the '3' and 5 intervening symbols that have a value of '4'. The data packet 724 follows the Sync Word 722 in transmission. According to C-PHY protocols, a receiver is configured to recognize and respond to a Sync Word 722 after receiving 5 symbols that have a value of '4' followed by a symbol that has a value of the '3'. In the illustrated example, the POST pattern 726 includes repeated instances of a 7-symbol sequence in which every symbol has a value of '4'. The number of repetitions may be defined by protocol, by application or by configuration during calibration.

Transitions between modes of operation 712, 714 are governed by certain MIPI Alliance-defined C-PHY protocols. In some instances, C-PHY protocols define time windows during which transitions between modes of operation 712, 714 are expected to be completed. A C-PHY interface in a receiving device is expected to enable its high-speed physical layer circuits within the time window defined for transitions from the low-power mode of operation 712 to the high-speed mode of operation 714. The C-PHY interface in the receiving device is further expected to disable its high-speed physical layer circuits within the time window defined for transitions from the high-speed mode of operation 714 to the low-power mode of operation 712. In conventional systems, the C-PHY interface uses programmable timers to monitor and track time windows. These programmable timers are typically managed by software and configured using lookup tables in which timer values can be indexed based on data rates configured for the C-PHY interface.

FIG. 8 illustrates the content of a lookup table 800 used to configure a timer that controls shutdown of certain high-speed physical layer circuits in a C-PHY interface provided in a receiving device. The time window for transitions from the high-speed mode of operation 714 to the low-power mode of operation 712 may have a defined duration configured to enable the receiver to flush all decoded data from buffers of its C-PHY interface before the high-speed physical layer circuits are disabled. In the example illustrated in FIG. 4, symbols derived by the decoder 424 from signaling state of the trio 440 are provided to serial-to-parallel convertors 426 which produce sets of 7 symbols that are processed by a demapper 428 to obtain 16-bit data in words. Multiple 16-bit data in words are buffered in a FIFO storage device 430. In order to prevent loss of data, the content of the serial-to-parallel convertors 426 and the FIFO storage device 430 must be flushed before certain high-speed physical layer circuits are disabled. Disabling the high-speed physical layer circuits disables receive clock generation circuits and deprives the data recovery circuits from timing information needed to capture and decode symbols that have been transmitted by a transmitting device.

The use of programmable timers and lookup tables increases the processing overhead of the C-PHY interface. Additionally, the clock signals used to increment or decrement the programmable timers may provide low resolution timing at certain higher symbol rates 802 and no resolution at some of the higher symbol rates 804 where, for example, the time window has expired before the first timer tick is registered. The timers are programmed with values sufficient to ensure that all remaining data will be flushed from the buffers of its C-PHY interface well before the time window has expired and the high-speed physical layer circuits are disabled, regardless of the symbol rate configured for the C-PHY interface. The delay in disabling the high-speed physical layer circuits after flushing all data can result in unnecessary power consumption by the C-PHY interface.

Certain aspects disclosed herein enable a receiving device to automatically shutdown or disable the high-speed physical layer circuits in a C-PHY interface as soon as the last encoded symbol has been decoded and the data buffers controlled by the high-speed physical layer circuits have been flushed. In one aspect, automatic shutdown of the high-speed physical layer circuits in the C-PHY interface can be implemented without the use of a programmable timer and associated lookup tables. Processing overhead and software complexity in the C-PHY interface can be reduced.

Figure 9:
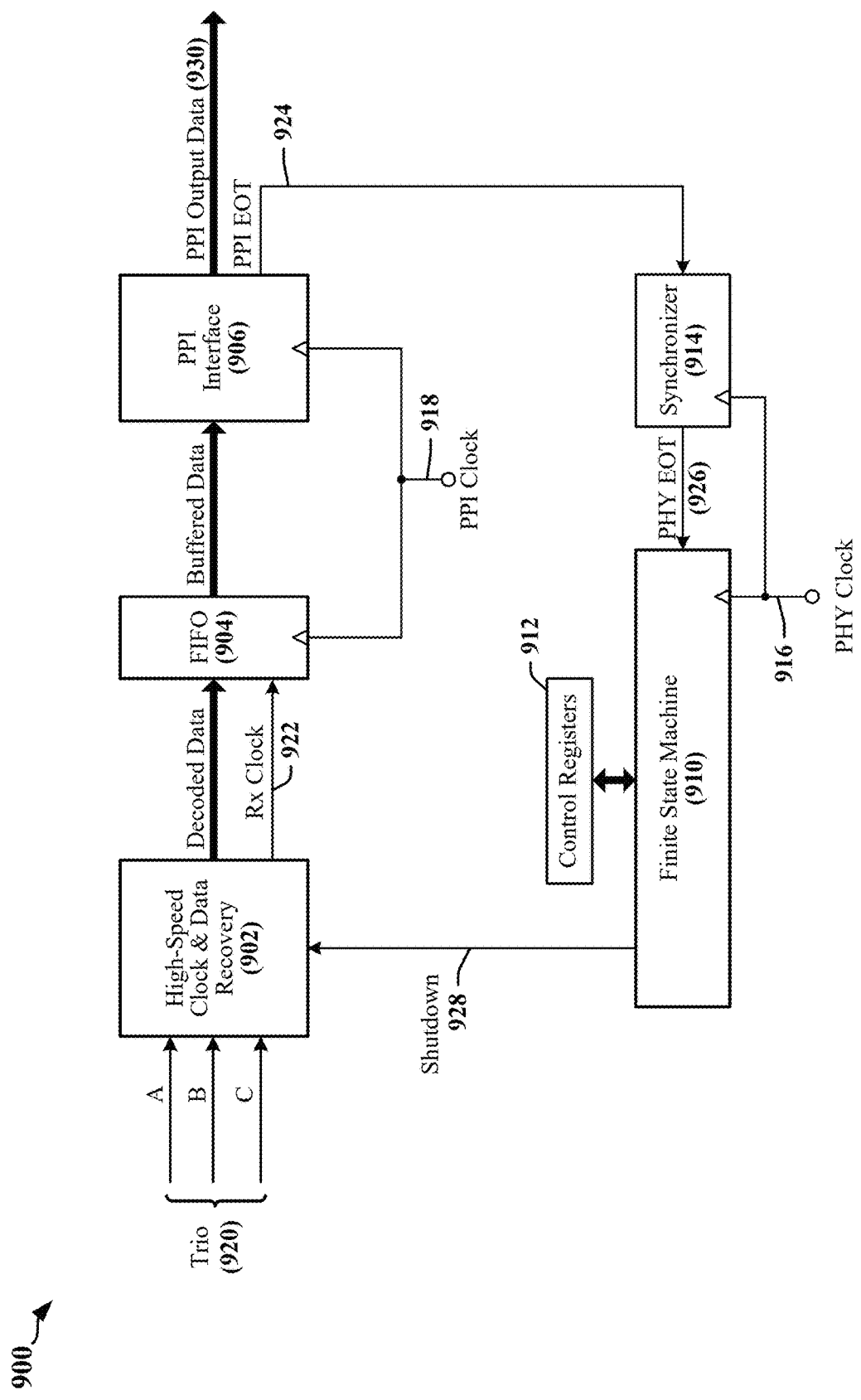
FIG. 9 illustrates a C-PHY interface that supports automatic shutdown of high-speed physical layer circuits in accordance with certain aspects of this disclosure.

FIG. 9 illustrates an example of a C-PHY interface 900 that can support automatic shutdown of high-speed physical layer circuits in a receiving device configured in accordance with certain aspects of this disclosure. In the illustrated example, the high-speed physical layer circuits can be automatically shut down without loading or monitoring a shut-down timer. The high-speed physical layer circuits include high-speed clock and data recovery circuits 902 coupled to three wires or connectors (the "trio 920") of a C-PHY bus. The high-speed clock and data recovery circuits 902 generate a receiver clock signal 922 using timing information extracted from transitions between signaling states of the trio 920. The receiver clock signal 922 can be used to clock decoded data into a FIFO storage device 904 that buffers decoded data received from the high-speed clock and data recovery circuits 902. Data may be clocked out of the FIFO storage device 904 using a PHY Protocol Interface (PPI) clock signal 918 generated or controlled by protocol layer circuits. Timing information in the PPI clock signal 918 may enable certain PPI interface circuits 906 to process, transfer and/or provide access to processed output data 930 for use by various circuits or modules of the receiving device. The PPI interface circuits 906 may be configured to process data decoded from the stream of symbols in accordance with C-PHY protocols. In some implementations, the high-speed clock and data recovery circuits 902 may signal the PPI interface circuits 906 when certain control signaling is detected in the stream of symbols received over the trio 920.

In the illustrated example, a finite state machine 910 may be configured to manage, monitor and control the operation of the C-PHY interface 900. Other processors or controllers may be used in other examples. The finite state machine 910 may assert control in response to the state of certain inputs and/or based on the values stored in certain control registers 912. According to certain aspects of this disclosure, the PPI interface circuits 906 may generate a signal (the PPI EOT signal 924) that indicates that an end of transmission has been detected. The PPI EOT signal 924 may be generated when a transaction has been completed according to applicable C-PHY protocols and/or that a valid POST pattern 726 (see FIG. 7) has been detected. In the illustrated example, a synchronizer circuit 914 receives and propagates the PPI EOT signal 924 as a PHY EOT signal 926 in accordance with timing provided by an internally generated clock signal 916 used by the finite state machine 910 and other control circuits.

The finite state machine 910 may respond to the PHY EOT signal 926 by asserting a power down or shutdown signal 928 that causes the high-speed physical layer circuits in the C-PHY interface 900 to be disabled or to enter a low-power mode of operation. The finite state machine 910 may assert the power down or shutdown signal 928 in accordance with timing indicated by the control registers 912. In some instances, the finite state machine 910 may refrain from asserting the power down or shutdown signal 928 based on certain bit settings in the control registers 912. In one example, a bit in one of the control registers 912 or multiple bits in one or more of the control registers 912 may be configured by higher level applications to prevent or defer disablement of the high-speed physical layer circuits in the C-PHY interface 900. In another example, a bit in one of the control registers 912 or multiple bits in one or more of the control registers 912 may be configured by higher level applications to select between low power and disabled modes of operation for the high-speed physical layer circuits in the C-PHY interface 900.

The high-speed physical layer circuits in the C-PHY interface 900 may be shut down according to a predefined synchronization scheme. In one example, the synchronization scheme may be defined by C-PHY protocols. In some implementations, the finite state machine 910 may manage the shutdown procedure. For instance, the finite state machine 910 may initiate steps in the shutdown procedure by writing certain bits or values to one or more of the control registers 912. The high-speed physical layer circuits in the C-PHY interface 900 may be shut down while a POST pattern 726 (see FIG. 7) defined by the MIPI Alliance C-PHY protocol is being received. A pattern of symbols corresponding to the POST pattern 726 may continue to be received after the end of transmission is indicated.

The use of the PPI EOT signal 924 and/or the PHY EOT signal 926 enables the C-PHY interface 900 to promptly shut down or disable high-speed physical layer circuits after completion of a C-PHY transaction. Prompt disablement of the high-speed physical layer circuits can yield significant power savings over time.

Examples of Processing Circuits and Methods

Figure 10:
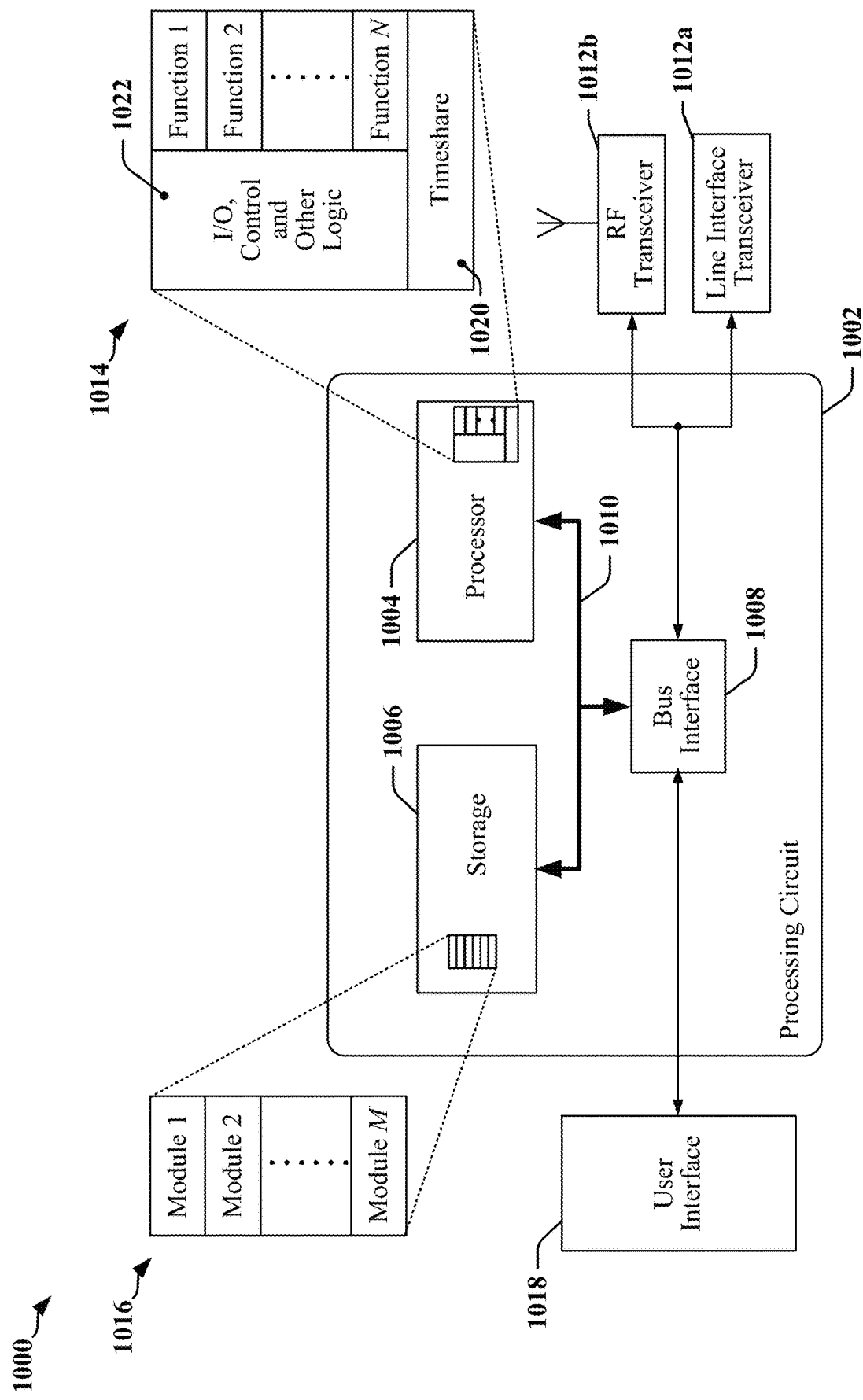
FIG. 10 illustrates one example of an apparatus employing a processing circuit that may be adapted in accordance with certain aspects disclosed herein.

FIG. 10 is a diagram illustrating an example of a hardware implementation for an apparatus 1000. In some examples, the apparatus 1000 may perform one or more functions disclosed herein. In accordance with various aspects of the disclosure, an element, or any portion of an element, or any combination of elements as disclosed herein may be implemented using a processing circuit 1002. The processing circuit 1002 may include one or more processors 1004 that are controlled by some combination of hardware and software modules. Examples of processors 1004 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. The one or more processors 1004 may be configured through a combination of software modules 1016 loaded during initialization, and further configured by loading or unloading one or more software modules 1016 during operation.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices, and may be referred to herein as computer-readable media and/or processor-readable media. The bus 1010 may also link various other circuits such as timing sources, timers, peripherals, voltage regulators, and power management circuits. A bus interface 1008 may provide an interface between the bus 1010 and one or more transceivers 1012a, 1012b. A transceiver 1012a, 1012b may be provided for each networking technology supported by the processing circuit. In some instances, multiple networking technologies may share some or all of the circuitry or processing modules found in a transceiver 1012a, 1012b. Each transceiver 1012a, 1012b provides a means for communicating with various other apparatus over a transmission medium. In one example, a transceiver 1012a may be used to couple the apparatus 1000 to a multi-wire bus. In another example, a transceiver 1012b may be used to connect the apparatus 1000 to a radio access network. Depending upon the nature of the apparatus 1000, a user interface 1018 (e.g., keypad, display, speaker, microphone, joystick) may also be provided, and may be communicatively coupled to the bus 1010 directly or through the bus interface 1008.

A processor 1004 may be responsible for managing the bus 1010 and for general processing that may include the execution of software stored in a computer-readable medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement certain methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer-readable medium. The external computer-readable medium and/or storage 1006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1006 may also include, by way of example, a carrier wave, a transmission line, and any other suitable medium for transmitting software and/or instructions that may be accessed and read by a computer. Computer-readable medium and/or the storage 1006 may reside in the processing circuit 1002, in the processor 1004, external to the processing circuit 1002, or be distributed across multiple entities including the processing circuit 1002. The computer-readable medium and/or storage 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004, and may manage access to external devices such as a transceiver 1012a, 1012b, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to a transceiver 1012a, 1012b, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the transceiver 1012a, 1012b, and device drivers, for example. To support the performance of multiple functions, the one or more processors 1004 may be configured to provide a multitasking environment, whereby each of a plurality of functions is implemented as a set of tasks serviced by the one or more processors 1004 as needed or desired. In one example, the multitasking environment may be implemented using a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

Figure 11:
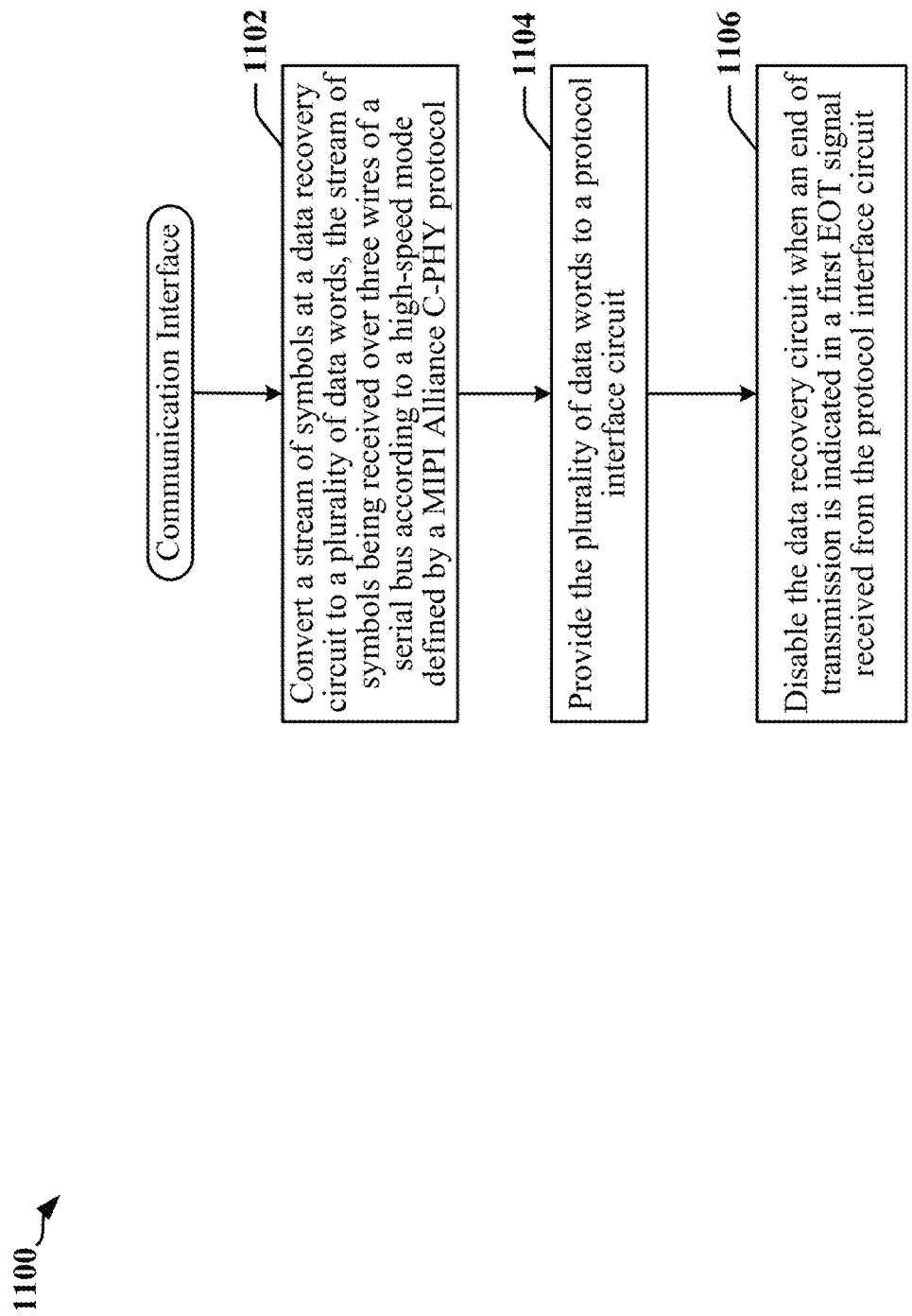
FIG. 11 is a flowchart that illustrates a method for operating a communication interface circuit in accordance with certain aspects disclosed herein.

FIG. 11 is a flowchart 1100 of a method for operating a communication interface circuit configured in accordance with certain aspects of this disclosure. In some instances, the method is implemented using one or more processors in a mobile communication device that includes a display or camera subsystem. The one or more processors may include a finite state machine.

At block 1102 in the illustrated method, a stream of symbols is converted at a data recovery circuit to a plurality of data words. The stream of symbols may be received over three wires of a serial bus according to a high-speed mode defined by a MIPI Alliance C-PHY protocol. At block 1104 in the illustrated method, the plurality of data words may be provided to a protocol interface circuit. At block 1106 in the illustrated method, the data recovery circuit may be disabled when an end of transmission is indicated in a first EOT signal received from the protocol interface circuit.

In some examples, signaling defined at the interface circuit for transitioning the serial bus to a low-speed mode defined by the MIPI Alliance C-PHY protocol may be received after the end of transmission is indicated. A continued pattern of symbols corresponding to a POST pattern defined by the MIPI Alliance C-PHY protocol may be received after the end of transmission is indicated.

In some implementations, the end of transmission is indicated when the protocol interface circuit has completed processing of the data received from the data recovery circuit. In some implementations, the protocol interface circuit is coupled to the output of the data recovery circuit using a FIFO buffer circuit that is configured to store the plurality of data words. The end of transmission may be indicated when the FIFO buffer has been emptied of the plurality of data words.

In some examples, a protocol interface clock signal that controls operation of the protocol interface circuit may be generated. The protocol interface clock signal may be suppressed when the data recovery circuit is disabled.

Figure 12:
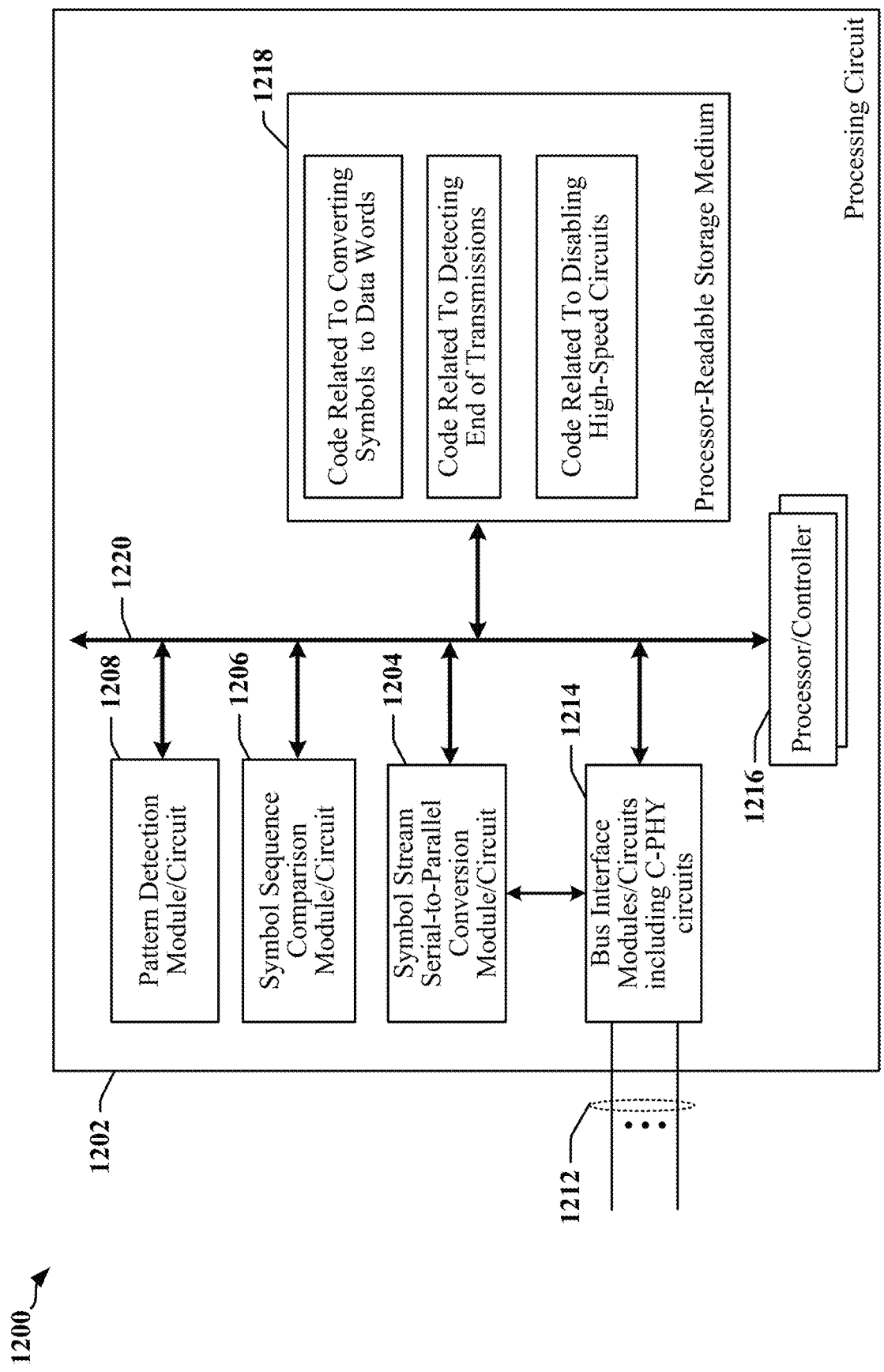
FIG. 12 illustrates a first example of a hardware implementation for a communication apparatus adapted in accordance with certain aspects disclosed herein.

FIG. 12 is a diagram illustrating a first example of a hardware implementation for an apparatus 1200 employing a processing circuit 1202. The processing circuit typically has one or more microprocessors, microcontrollers, digital signal processors, sequencers and/or state machines, represented generally by the processors 1216. The processing circuit 1202 may be implemented with a bus architecture, represented generally by the bus 1220. The bus 1220 may include any number of interconnecting buses and bridges depending on the specific application of the processing circuit 1202 and the overall design constraints. The bus 1220 links together various circuits including multiple processors 1216, the modules or circuits 1204, 1206 and 1208 and the processor-readable storage medium 1218. A bus interface circuit and/or module 1214 may be provided to support communications over multiple serial data links 1212. The bus 1220 may also link various other circuits such as timing sources, peripherals, voltage regulators, and power management circuits, which are well known in the art, and therefore, will not be described any further.

The processors 1216 may be responsible for general processing, including the execution of software, code and/or instructions stored on the processor-readable storage medium 1218. The processor-readable storage medium 1218 may include a non-transitory storage medium. The software, when executed by the processors 1216, causes the processing circuit 1202 to perform the various functions described supra for any particular apparatus. The processor-readable storage medium may be used for storing data that is manipulated by the processors 1216 when executing software. The processing circuit 1202 further includes at least one of the modules 1204, 1206 and 1208. The modules 1204, 1206 and 1208 may be software modules running in the processors 1216, resident/stored in the processor-readable storage medium 1218, one or more hardware modules coupled to the processors 1216, or some combination thereof. The modules 1204, 1206 and 1208 may include microcontroller instructions, state machine configuration parameters, or some combination thereof.

In one configuration, the apparatus 1200 includes modules and/or circuits 1204 adapted to convert streams of 3-bit symbols to parallel multibit data words, modules and/or circuits 1206 adapted to compare sequences of symbols, and modules and/or circuits 1208 adapted to detect patterns in a stream of symbols, including EOT patterns.

In one example, the apparatus 1200 includes means for converting a stream of symbols at a data recovery circuit to a plurality of data words, means for processing the plurality of data words including a protocol interface circuit, and means for disabling the data recovery circuit when an end of transmission is indicated in a first EOT signal received from the protocol interface circuit. The stream of symbols may be received over three wires of a serial bus according to a high-speed mode defined by a MIPI Alliance C-PHY protocol.

In some implementations, signaling defined for transitioning the serial bus to a low-speed mode defined by the MIPI Alliance C-PHY protocol is received at the interface circuit after the end of transmission is indicated. In some implementations, a pattern of symbols corresponding to a POST pattern defined by the MIPI Alliance C-PHY protocol continues to be received when the end of transmission is indicated.

In some implementations, the end of transmission is indicated when the protocol interface circuit has completed processing of the data received from the data recovery circuit. The apparatus 1200 may include a FIFO buffer circuit that couples the protocol interface circuit to the output of the data recovery circuit. The FIFO buffer circuit may be configured to store a plurality of data words received from the data recovery circuit. The end of transmission may be indicated when the FIFO buffer has been emptied of the plurality of data words.

In some implementations, the apparatus 1200 includes a clock generation circuit configured to provide a protocol interface clock signal that controls operation of the protocol interface circuit. The protocol interface clock signal may be suppressed when the data recovery circuit is disabled.

In some implementations, the apparatus 1200 includes a synchronization circuit configured to propagate the first EOT signal as a second EOT signal in accordance with timing provided by an internally generated clock signal used by the finite state machine.

The processor-readable storage medium 1218 may include instructions that cause the processing circuit 1202 to convert a stream of symbols at a data recovery circuit to provide a plurality of data words, provide the plurality of data words to a protocol interface circuit, and disable the data recovery circuit when an end of transmission is indicated in a first EOT signal received from the protocol interface circuit. The stream of symbols may be received over three wires of a serial bus according to a high-speed mode defined by a MIPI Alliance C-PHY protocol.

In some instances, signaling defined for transitioning the serial bus to a low-speed mode defined by the MIPI Alliance C-PHY protocol is received at the interface circuit after the end of transmission is indicated. In some instances, a pattern of symbols corresponding to a POST pattern defined by the MIPI Alliance C-PHY protocol continues to be received when the end of transmission is indicated.

In some implementations, the end of transmission is indicated when the protocol interface circuit has completed processing of the data received from the data recovery circuit. A FIFO buffer circuit that couples the protocol interface circuit to the output of the data recovery circuit may be configured to store a plurality of data words received from the data recovery circuit. The end of transmission may be indicated when the FIFO buffer has been emptied of the plurality of data words.

In some implementations, the code is further configured to cause the processing circuit to suppress a protocol interface clock signal that controls operation of the protocol interface circuit when the data recovery circuit is disabled.

An interface circuit provided in accordance with certain aspects of this disclosure includes a data recovery circuit configured to receive a stream of symbols over three wires of a serial bus according to a high-speed mode defined by a MIPI Alliance C-PHY protocol, a protocol interface circuit coupled to an output of the data recovery circuit and configured to receive data from the data recovery circuit, and a finite state machine configured to cause the data recovery circuit to be disabled when an end of transmission is indicated in a first EOT signal received from the protocol interface circuit.

In some instances, signaling defined for transitioning the serial bus to a low-speed mode defined by the MIPI Alliance C-PHY protocol is received at the interface circuit after the end of transmission is indicated. In some instances, a pattern of symbols corresponding to a POST pattern defined by the MIPI Alliance C-PHY protocol continues to be received when the end of transmission is indicated.

In some implementations, the end of transmission is indicated when the protocol interface circuit has completed processing of the data received from the data recovery circuit. The interface circuit may include a FIFO buffer circuit configured to couple the protocol interface circuit to the output of the data recovery circuit may be configured to store a plurality of data words received from the data recovery circuit. The end of transmission may be indicated when the FIFO buffer has been emptied of the plurality of data words.

A clock generation circuit may be configured to provide a protocol interface clock signal that controls operation of the protocol interface circuit. The protocol interface clock signal may be suppressed when the data recovery circuit is disabled. A synchronization circuit may be configured to propagate the first EOT signal as a second EOT signal in accordance with timing provided by an internally generated clock signal used by the finite state machine.

Some implementation examples are described in the following numbered clauses:

1. An interface circuit, comprising: a data recovery circuit configured to receive a stream of symbols over three wires of a serial bus according to a high-speed mode defined by a Mobile Industry Processor Interface (MIPI) Alliance C-PHY protocol; a protocol interface circuit coupled to an output of the data recovery circuit and configured to receive data from the data recovery circuit; and a finite state machine configured to cause the data recovery circuit to be disabled when an end of transmission is indicated in a first end-of-transmission (EOT) signal received from the protocol interface circuit.
2. The interface circuit as described in clause 1, wherein signaling defined for transitioning the serial bus to a low-speed mode defined by the MIPI Alliance C-PHY protocol is received at the interface circuit after the end of transmission is indicated.
3. The interface circuit as described in clause 1 or clause 2, wherein a pattern of symbols corresponding to a POST pattern defined by the MIPI Alliance C-PHY protocol continues to be received when the end of transmission is indicated.
4. The interface circuit as described in any of clauses 1-3, wherein the end of transmission is indicated when the protocol interface circuit has completed processing of the data received from the data recovery circuit.

5. The interface circuit as described in any of clauses 1-4, further comprising: a first-in-first-out (FIFO) buffer circuit that couples the protocol interface circuit to the output of the data recovery circuit, the FIFO buffer circuit being configured to store a plurality of data words received from the data recovery circuit.

6. The interface circuit as described in clause 5, wherein the end of transmission is indicated when the FIFO buffer has been emptied of the plurality of data words.

7. The interface circuit as described in any of clauses 1-6, further comprising: a clock generation circuit configured to provide a protocol interface clock signal that controls operation of the protocol interface circuit, wherein the protocol interface clock signal is suppressed when the data recovery circuit is disabled.

8. The interface circuit as described in any of clauses 1-7, further comprising: a synchronization circuit configured to propagate the first EOT signal as a second EOT signal in accordance with timing provided by an internally generated clock signal used by the finite state machine.

9. A method for operating a communication interface circuit, comprising: converting a stream of symbols at a data recovery circuit to a plurality of data words, the stream of symbols being received over three wires of a serial bus according to a high-speed mode defined by a Mobile Industry Processor Interface (MIPI) Alliance C-PHY protocol; providing the plurality of data words to a protocol interface circuit; and disabling the data recovery circuit when an end of transmission is indicated in a first end-of-transmission (EOT) signal received from the protocol interface circuit.

10. The method as described in clause 9, further comprising: receiving signaling defined at the interface circuit for transitioning the serial bus to a low-speed mode defined by the MIPI Alliance C-PHY protocol after the end of transmission is indicated.

11. The method as described in clause 9 or clause 10, further comprising: receiving a continued pattern of symbols corresponding to a POST pattern defined by the MIPI Alliance C-PHY protocol after the end of transmission is indicated.

12. The method as described in any of clauses 9-11, wherein the end of transmission is indicated when the protocol interface circuit has completed processing of the data received from the data recovery circuit.

13. The method as described in any of clauses 9-12, further comprising: coupling the protocol interface circuit to an output of the data recovery circuit using a first-in-first-out (FIFO) buffer circuit that is configured to store the plurality of data words.

14. The method as described in clause 13, wherein the end of transmission is indicated when the FIFO buffer has been emptied of the plurality of data words.

15. The method as described in any of clauses 9-14, further comprising: generating a protocol interface clock signal that controls operation of the protocol interface circuit, wherein the protocol interface clock signal is suppressed when the data recovery circuit is disabled.

16. An apparatus, comprising: means for converting a stream of symbols at a data recovery circuit to a plurality of data words, the stream of symbols being received over three wires of a serial bus according to a high-speed mode defined by a Mobile Industry Processor Interface (MIPI) Alliance C-PHY protocol; means for processing the plurality of data words including a protocol interface circuit; and means for disabling the data recovery circuit when an end of transmission is indicated in a first end-of-transmission (EOT) signal received from the protocol interface circuit.

17. The apparatus as described in clause 16, wherein signaling defined for transitioning the serial bus to a low-speed mode defined by the MIPI Alliance C-PHY protocol is received at the interface circuit after the end of transmission is indicated.

18. The apparatus as described in clause 16 or clause 17, wherein a pattern of symbols corresponding to a POST pattern defined by the MIPI Alliance C-PHY protocol continues to be received when the end of transmission is indicated.

19. The apparatus as described in any of clauses 16-18, wherein the end of transmission is indicated when the protocol interface circuit has completed processing of the data received from the data recovery circuit.

20. The apparatus as described in any of clauses 16-19, further comprising: a first-in-first-out (FIFO) buffer circuit that couples the protocol interface circuit to an output of the data recovery circuit, the FIFO buffer circuit being configured to store a plurality of data words received from the data recovery circuit.

21. The apparatus as described in any of clauses 16-20, wherein the end of transmission is indicated when the FIFO buffer has been emptied of the plurality of data words.

22. The apparatus as described in any of clauses 16-21, further comprising: a clock generation circuit configured to provide a protocol interface clock signal that controls operation of the protocol interface circuit, wherein the protocol interface clock signal is suppressed when the data recovery circuit is disabled.

23. The apparatus as described in any of clauses 16-22, further comprising: a synchronization circuit configured to propagate the first EOT signal as a second EOT signal in accordance with timing provided by an internally generated clock signal used by the finite state machine.

24. A processor-readable storage medium comprising code configured to cause a processing circuit to: convert a stream of symbols at a data recovery circuit to provide a plurality of data words, the stream of symbols being received over three wires of a serial bus according to a high-speed mode defined by a Mobile Industry Processor Interface (MIPI) Alliance C-PHY protocol; provide the plurality of data words to a protocol interface circuit; and disable the data recovery circuit when an end of transmission is indicated in a first end-of-transmission (EOT) signal received from the protocol interface circuit.

25. The processor-readable storage medium as described in clause 24, wherein signaling defined for transitioning the serial bus to a low-speed mode defined by the MIPI Alliance C-PHY protocol is received at the interface circuit after the end of transmission is indicated.

26. The processor-readable storage medium as described in clause 24 or clause 25, wherein a pattern of symbols corresponding to a POST pattern defined by the MIPI Alliance C-PHY protocol continues to be received when the end of transmission is indicated.

27. The processor-readable storage medium of claim 24, wherein the end of transmission is indicated when the protocol interface circuit has completed processing of the data received from the data recovery circuit.
28. The processor-readable storage medium as described in any of clauses 24-27, wherein a first-in-first-out (FIFO) buffer circuit couples the protocol interface circuit to an output of the data recovery circuit, the FIFO buffer circuit being configured to store a plurality of data words received from the data recovery circuit.
29. The processor-readable storage medium as described in a clause 28, wherein the end of transmission is indicated when the FIFO buffer has been emptied of the plurality of data words.
30. The processor-readable storage medium as described in any of clauses 24-29, wherein the code is further configured to cause the processing circuit to: suppress a protocol interface clock signal that controls operation of the protocol interface circuit when the data recovery circuit is disabled.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:
1. An interface circuit, comprising:
a data recovery circuit configured to decode data from a stream of symbols received over three wires of a serial bus according to a high-speed mode defined by a Mobile Industry Processor Interface (MIPI) Alliance C-PHY protocol;
a protocol interface circuit coupled to an output of the data recovery circuit and configured to receive decoded data from the data recovery circuit, and further configured to generate a first end-of-transmission (EOT) signal that indicates whether data transmission has been completed; and
a finite state machine configured to cause the data recovery circuit to be disabled when the first EOT signal indicates that data transmission has been completed.
2. The interface circuit of claim 1, wherein signaling defined for transitioning the serial bus to a low-speed mode defined by the MIPI Alliance C-PHY protocol is received at the interface circuit after data transmission has been completed.
3. The interface circuit of claim 1, wherein a pattern of symbols corresponding to a POST pattern defined by the MIPI Alliance C-PHY protocol continues to be received after data transmission has been completed.
4. The interface circuit of claim 1, wherein the EOT signal indicates that data transmission has been completed when the protocol interface circuit has completed processing of the data received from the data recovery circuit.
5. The interface circuit of claim 1, further comprising:
a first-in-first-out (FIFO) buffer circuit that couples the protocol interface circuit to the output of the data recovery circuit, the FIFO buffer circuit being configured to store a plurality of data words received from the data recovery circuit.
6. The interface circuit of claim 5, wherein the EOT signal indicates that data transmission has been completed when the FIFO buffer has been emptied of the plurality of data words.
7. The interface circuit of claim 1, further comprising:
a clock generation circuit configured to provide a protocol interface clock signal that controls operation of the protocol interface circuit, wherein the protocol interface clock signal is suppressed when the data recovery circuit is disabled.
8. The interface circuit of claim 1, further comprising:
a synchronization circuit configured to propagate the first EOT signal as a second EOT signal in accordance with timing provided by an internally generated clock signal used by the finite state machine.
9. A method for operating a communication interface circuit, comprising:
decoding a stream of symbols at a data recovery circuit to obtain a plurality of data words, the stream of symbols being received over three wires of a serial bus according to a high-speed mode defined by a Mobile Industry Processor Interface (MIPI) Alliance C-PHY protocol;
providing the plurality of data words to a protocol interface circuit;
generating a first end-of-transmission (EOT) signal at the protocol interface circuit, the first EOT signal indicating whether data transmission has been completed; and
disabling the data recovery circuit when the first EOT signal indicates that data transmission has been completed.
10. The method of claim 9, further comprising:
receiving signaling defined at the interface circuit for transitioning the serial bus to a low-speed mode defined by the MIPI Alliance C-PHY protocol after data transmission has been completed.
11. The method of claim 9, further comprising:
receiving a continued pattern of symbols corresponding to a POST pattern defined by the MIPI Alliance C-PHY protocol after data transmission has been completed.
12. The method of claim 9, wherein the EOT signal indicates that data transmission has been completed when the protocol interface circuit has completed processing of the data received from the data recovery circuit.
13. The method of claim 9, further comprising:
coupling the protocol interface circuit to an output of the data recovery circuit using a first-in-first-out (FIFO) buffer circuit that is configured to store the plurality of data words.

14. The method of claim 13, wherein the EOT signal indicates that data transmission has been completed when the FIFO buffer has been emptied of the plurality of data words.

15. The method of claim 9, further comprising:
generating a protocol interface clock signal that controls operation of the protocol interface circuit, wherein the protocol interface clock signal is suppressed when the data recovery circuit is disabled.

16. An apparatus, comprising:
means for decoding a stream of symbols at a data recovery circuit to obtain a plurality of data words, the stream of symbols being received over three wires of a serial bus according to a high-speed mode defined by a Mobile Industry Processor Interface (MIPI) Alliance C-PHY protocol;
means for processing the plurality of data words including a protocol interface circuit wherein the protocol interface circuit is configured to generate a first end-of-transmission (EOT) signal indicating whether data transmission has been completed; and
means for disabling the data recovery circuit when the first EOT signal indicates that data transmission has been completed.

17. The apparatus of claim 16, wherein signaling defined for transitioning the serial bus to a low-speed mode defined by the MIPI Alliance C-PHY protocol is received at the interface circuit after data transmission has been completed.

18. The apparatus of claim 16, wherein a pattern of symbols corresponding to a POST pattern defined by the MIPI Alliance C-PHY protocol continues to be received after data transmission has been completed.

19. The apparatus of claim 16, wherein the EOT signal indicates that data transmission has been completed when the protocol interface circuit has completed processing of the data received from the data recovery circuit.

20. The apparatus of claim 16, further comprising:
a first-in-first-out (FIFO) buffer circuit that couples the protocol interface circuit to an output of the data recovery circuit, the FIFO buffer circuit being configured to store a plurality of data words received from the data recovery circuit.

21. The apparatus of claim 20, wherein the EOT signal indicates that data transmission has been completed when the FIFO buffer has been emptied of the plurality of data words.

22. The apparatus of claim 16, further comprising:
a clock generation circuit configured to provide a protocol interface clock signal that controls operation of the protocol interface circuit, wherein the protocol interface clock signal is suppressed when the data recovery circuit is disabled.

23. The apparatus of claim 16, further comprising:
a synchronization circuit configured to propagate the first EOT signal as a second EOT signal in accordance with timing provided by an internally generated clock signal used by the means for disabling the data recovery circuit.

24. A non-transitory processor-readable storage medium comprising code configured to cause a processing circuit to:
decode a stream of symbols at a data recovery circuit to obtain a plurality of data words, the stream of symbols being received over three wires of a serial bus according to a high-speed mode defined by a Mobile Industry Processor Interface (MIPI) Alliance C-PHY protocol;
provide the plurality of data words to a protocol interface circuit;
generate a first end-of-transmission (EOT) signal at the protocol interface circuit, the first EOT signal indicating whether data transmission has been completed; and
disable the data recovery circuit when the first EOT signal indicates that data transmission has been completed.

25. The non-transitory processor-readable storage medium of claim 24, wherein signaling defined for transitioning the serial bus to a low-speed mode defined by the MIPI Alliance C-PHY protocol is received at the interface circuit after data transmission has been completed.

26. The non-transitory processor-readable storage medium of claim 24, wherein a pattern of symbols corresponding to a POST pattern defined by the MIPI Alliance C-PHY protocol continues to be received after data transmission has been completed.

27. The non-transitory processor-readable storage medium of claim 24, wherein the EOT signal indicates that data transmission has been completed when the protocol interface circuit has completed processing of the data received from the data recovery circuit.

28. The non-transitory processor-readable storage medium of claim 24, wherein a first-in-first-out (FIFO) buffer circuit couples the protocol interface circuit to an output of the data recovery circuit, the FIFO buffer circuit being configured to store a plurality of data words received from the data recovery circuit.

29. The non-transitory processor-readable storage medium of claim 28, wherein the EOT signal indicates that data transmission has been completed when the FIFO buffer has been emptied of the plurality of data words.

30. The non-transitory processor-readable storage medium of claim 24, wherein the code is further configured to cause the processing circuit to:
suppress a protocol interface clock signal that controls operation of the protocol interface circuit when the data recovery circuit is disabled.

* * * * *